(12) United States Patent
Fujita

(10) Patent No.: US 7,627,244 B2
(45) Date of Patent: Dec. 1, 2009

(54) OPTICAL TRANSMISSION APPARATUS, CONTINUITY TESTING METHOD THEREIN, AND OPTICAL TRANSMISSION SYSTEM

(75) Inventor: Takehiro Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 11/209,625

(22) Filed: Aug. 24, 2005

(65) Prior Publication Data
US 2006/0269284 A1 Nov. 30, 2006

(30) Foreign Application Priority Data
May 26, 2005 (JP) .............................. 2005-154477

(51) Int. Cl.
*H04B 10/08* (2006.01)
*H04J 14/02* (2006.01)

(52) U.S. Cl. .............................. 398/19; 398/9; 398/10; 398/11; 398/12; 398/14; 398/16; 398/17; 398/18; 398/25; 398/34; 398/37; 398/38; 398/83

(58) Field of Classification Search .................... 398/25, 398/33, 37, 38, 79, 82, 83, 94, 177, 9, 10, 398/11, 12, 14, 16, 17, 18, 19, 34
See application file for complete search history.

(56) References Cited

U.S. PATENT DOCUMENTS

| 6,219,162 B1 * | 4/2001 | Barnard et al. ................ 398/9 |
| 6,515,777 B1 * | 2/2003 | Arnold et al. ................ 398/97 |
| 6,577,652 B1 | 6/2003 | Kamata ...................... 370/535 |
| 6,871,021 B2 * | 3/2005 | Graves et al. ................. 398/45 |
| 7,002,734 B2 * | 2/2006 | Horachi et al. ........... 359/341.4 |
| 7,233,741 B2 * | 6/2007 | Ishizuka et al. ............... 398/48 |
| 7,286,755 B1 * | 10/2007 | Goodwill et al. ............. 398/26 |
| 2004/0109694 A1 * | 6/2004 | Suzuki et al. ............... 398/177 |
| 2005/0041968 A1 | 2/2005 | Takahashi |

FOREIGN PATENT DOCUMENTS

| EP | 0790718 A | 8/1997 |
| JP | 2000-004213 | 1/2000 |

OTHER PUBLICATIONS

European Search Report based on EP 05018472 (dated Dec. 2, 2008).

* cited by examiner

*Primary Examiner*—Ken N Vanderpuye
*Assistant Examiner*—Daniel G Dobson
(74) *Attorney, Agent, or Firm*—Hanify & King, P.C.

(57) ABSTRACT

An optical transmission apparatus comprises a preamplifier controlling unit for controlling a preamplifier so that amplified spontaneous emission including all wavelength bands of a wavelength-multiplexed signal beam is outputted toward a wavelength demultiplexing unit, with the wavelength-multiplexed signal beam not inputted, power monitors for monitoring optical powers of the amplified spontaneous emission fed from the preamplifier and wavelength-demultiplexed by the wavelength demultiplexing unit, and a determining unit for determining the continuity state of an optical propagation path of each wavelength component on the basis of a result of monitoring by the power monitors. The optical transmission apparatus allows the continuity test on optical propagation paths of channels including a channel not used at the time of a start of the operation to be made easier than the known techniques.

15 Claims, 11 Drawing Sheets

OPTICAL TRANSMISSION APPARATUS, CONTINUITY TESTING METHOD THEREIN, AND OPTICAL TRANSMISSION SYSTEM

BACKGROUND OF THE INVENTION

1) Field of the Invention

The present invention relates to an optical transmission apparatus, a continuity testing method therein, and an optical transmission system suitable for use in an optical communication system having the wavelength division multiplexing (WDM) function.

2) Description of the Related Art

In the field of the optical communication networks having the WDM function, the DWDM (Dense WDM) technique is introduced into not only known long-distance (long-haul) networks but also local (metro) networks because of a recent rapid increase in communication traffic. In the WDM network, an optical add drop multiplexer (OADM) for adding a channel to be wavelength-multiplexed or dropping a channel is appropriately arranged as a node.

Particularly, many WDM networks in the metro networks adapt a network configuration in which a number of OADM nodes are arranged in a ring. With expansion of the network scale in the future, it is estimated that the number of the OADM nodes to be arranged in a ring is increased.

FIG. 11 is a diagram showing a structure of a general OADM node used in the above-described WDM network. The OADM node 100 shown in FIG. 11 comprises a pre-amplifier 101, an optical demultiplexer 102, an optical cross-connect unit 103, a variable optical attenuator 104, an optical multiplexer 105 and a post-amplifier 106, as optical components.

A wavelength-multiplexed signal inputted to the OADM node 100 through a transmission line 107 is amplified by the pre-amplifier 101, then demultiplexed into wavelengths by the optical demultiplexer 102. The optical crossconnect unit 103 selectively outputs each of wavelength components demultiplexed by the optical demultiplexer 102 toward either the VOA 104 in the following stage or a drop port DP. When the wavelength component demultiplexed by the optical demultiplexer 102 is outputted to the drop port, a light beam of a corresponding wavelength component can be inputted to the optical crossconnect unit 103 through an add port AP, and outputted to the VOA 104.

The VOA 104 variably attenuates each of the wavelength components outputted from the optical crossconnect unit 103 to adjust the level thereof. The optical multiplexer 105 wavelength-multiplexes light beams of the wavelength components from the VOA 104. The post-amplifier 106 amplifies the wavelength-multiplexed beam from the optical multiplexer 105 as needed, and outputs the wavelength-multiplexed signal beam undergone the add/drop process through a transmission line 108.

In Patent Document 1 below, there is described a technique in which a function corresponding to the above optical crossconnect unit 103 is configured with 2×2 optical switches in number corresponding to the number of wavelengths demultiplexed by the optical demultiplexer 102, and the VOA 104 has an output constant controlling function of automatically keeping the power of each wavelength component at a predetermined constant value.

As shown in FIG. 11 described above, the OADM node 100 is configured with various optical components (refer to reference characters 101 to 106). It is general to adopt optical connectors to optically connect these optical components. Adoption of optical connectors for the connections may increase the splice loss or the quantity of reflectance because of contaminants adhering on the spliced surface of the connector. When the splice loss or the quantity of reflectance is considerable, it may cause disconnection due to degradation of the transmission quantity such as the bit error rate.

On the other hand, with an increase in the number of wavelengths and nodes arranged in a ring, the number of connection points by the use of optical connectors as being the OADM nodes 100 is rapidly increased. When the number of wavelengths is 40 and the number of OADM nodes arranged in a ring network is 20, for example, the number of connection points inside the node by the use of optical connectors or the like in the ring network is considered to be more than 3000 only in the OADM nodes.

Accordingly, the continuity test on a point of the optical connector which may cause an error is important to confirm the performance of the apparatus. However, if the continuity test is performed on each of all the points at which the connectors are mounted, the number of times of the operation will be considerable because the number of the points is considerable. With respect to an optical apparatus other than the OADM node, the load of the operation may be enormous at the time of the continuity test on the apparatus that has a function of demultiplexing wavelengths of a wavelength-multiplexed optical signal.

With respect to the above problem, the number of wavelengths at the time of a start of the operation is, practically, about ten at most when WDM is introduced into a real line. Accordingly, only in the continuity test on optical propagation paths through optical components disposed for communications over channels to be used at the time of the initial start, the continuity of signals is confirmed (continuity confirmation) by using a transceiver such as a transponder, which is introduced and connected along with the WDM system.

In concrete, in order to output a light beam having a wavelength of each channel to an optical propagation path to confirm the continuity, an optical output element such as a wavelength tunable laser or the like is separately disposed, and the receiving state of the light beam propagated through the optical propagation path is confirmed by means of a transponder or the like while the output light beam wavelength of the wavelength tunable laser is appropriately controlled, whereby the continuity of the optical propagation path of each wavelength channel is confirmed.

In the method using a transponder to confirm the continuity, it is unlikely that a transponder for a channel not used at the time of the initial operation is disposed. For this, it is not general to confirm the continuity of an optical propagation path through optical components disposed for communication over a channel not used at the time of the start of the operation.

In this case, when an operational channel is increased because of an increase in traffic, the continuity test using a transponder newly disposed is performed after the operation of the apparatus is started. When the confirmation operation reveals abnormality in the continuity of the optical propagation path through optical components disposed for communication over an individual optical channel, it becomes necessary to do a continuity restoration work such as cleaning of an optical connector connecting optical components for a relevant channel.

[Patent Document 1] Unexamined Japanese Patent Application Publication No. 2000-4213

However, in a system using an optical amplifier for collectively amplifying wavelength-multiplexed signals, the maintenance work such as cleaning or the like of a connector spliced surface requires all the channels to be once stopped, in many cases. Namely, it is necessary to stop the communications over the other channels in which no error occurs each time an operational channel is increased in order to do the necessary continuity restoration work for the increased channel. It is desirable to avoid such stopping of the communication channels in operation each time a channel is increased, as much as possible to keep the stability of the communication.

In order to decrease the possibility that such cleaning work on a connector becomes necessary after the operation is started, it is desirable to collectively test the continuity of optical propagation paths of all channels that can be accommodated when the system is introduced. When the apparatus is operated as a node, it is desirable to detect abnormality in each optical component that can be hindrance of the continuity of the light beam on the optical propagation path, as well as the continuity confirmation of the optical connectors, as a matter of course.

There have been problems that it is necessary to separately prepare an element such as a wavelength tunable laser that can output a light beam having each channel in order to test the continuity, that the cost increases when the continuity testing function is given to the node apparatus, and that a longer time is required until the commercial operation is started because the load on the operator who controls the wavelength tunable laser increases.

SUMMARY OF THE INVENTION

In the light of the above problems, an object of the present invention is to provide a continuity test on optical propagation paths through optical components disposed for communications over all channels that the apparatus can accommodate including a channel that is not used at the time of a start of the operation, which can be made easier than the known techniques.

Another object of the present invention is to provide a continuity test on optical propagation paths of all channels that the apparatus can accommodate, which can be made within a shorter time than the known techniques.

A further object of the present invention is to provide a continuity test on optical propagation paths of all channels that the apparatus can accommodate, which can be made at a lower cost than the known techniques.

One preferred mode of the present invention therefore provides an optical transmission apparatus having a preamplifier for pre-amplifying a wavelength-multiplexed signal beam inputted through a transmission line and a wavelength demultiplexing unit for demultiplexing the wavelength-multiplexed signal beam amplified by the preamplifier into wavelengths, the optical transmission apparatus comprising a preamplifier controlling unit for controlling the preamplifier so that amplified spontaneous emission including all wavelength bands of the wavelength-multiplexed signal beam is outputted to the wavelength demultiplexing unit, with the wavelength-multiplexed signal beam not inputted, an optical power monitor for monitoring optical powers of wavelength components of the amplified spontaneous emission fed from the preamplifier and demultiplexed by the wavelength demultiplexing unit, and a determining unit for determining a continuity state of an optical propagation path of each of the wavelength components demultiplexed by the wavelength demultiplexing unit on the basis of a result of monitoring by the optical power monitor.

The present invention further provides an optical transmission apparatus having a preamplifier for pre-amplifying a wavelength-multiplexed signal beam inputted through an input transmission line, a wavelength demultiplexing unit for wavelength-demultiplexing the wavelength-multiplexed signal beam from the preamplifier into wavelengths, an add/drop processing unit for performing an adding/dropping process on signal beams at the respective wavelengths, and a multiplexing unit disposed in a lower stream than the add/drop processing unit to wavelength-multiplex the signal beams at the respective wavelengths undergone the adding/dropping process and to output through an output transmission line, the optical transmission apparatus comprising a first control unit for controlling the preamplifier so that amplified spontaneous emission including all wavelength bands to be undergone an output route switching process by the add/drop processing unit is outputted, with the wavelength-multiplexed signal beam not inputted, a second control unit for controlling the add/drop processing unit so that wavelength components of the amplified spontaneous emission outputted the wavelength demultiplexing unit are outputted as they are toward the multiplexing unit, an optical power monitor for detecting an optical power of each of the wavelength components of the amplified spontaneous emission outputted from the add/drop processing unit under control of the second control unit, and a determining unit for determining a continuity state of an optical propagation path of each of the wavelength components in an upper stream than the optical power monitor on the basis of a result of monitoring by the optical power monitor.

The optical transmission apparatus may further comprise a variable attenuator for variably attenuating the optical power of each of the wavelength components from the add/drop processing unit, wherein, the optical power monitor may comprise a first optical power monitor for monitoring the optical power of each of the wavelength components of the amplified spontaneous emission outputted from the add/drop processing unit in the upper stream than the variable attenuator, a second optical power monitor for monitoring the optical power of each of the wavelength components of the amplified spontaneous emission outputted from the add/drop processing unit from the amplified spontaneous emission wavelength-multiplexed by the multiplexing unit, a third optical power monitor for monitoring the optical power of each of the wavelength components attenuated by the variable attenuator in the upper stream than the multiplexing unit, and an attenuation quantity constant controlling unit for controlling the variable attenuator on the basis of results of monitoring by the first and third power monitors so that an attenuation quantity of the variable attenuator for each of the wavelength components is constant, the determining unit may comprise a first determining unit for determining a continuity state of an optical propagation path of each of the wavelength components in the upper stream than the first optical power monitor on the basis of a result of monitoring by the first optical power monitor, and a second determining unit for determining the continuity state of the optical propagation path of each of the wavelength components in the upper stream than the second optical power monitor and the lower stream than the third optical power monitor on the basis of a result of monitoring by the second optical power monitor.

Alternatively, the optical transmission apparatus may further comprise a variable attenuator for variably attenuating an optical power of each of the wavelength components from the add/drop processing unit, wherein, the optical power monitor may comprise a first power monitor for monitoring the optical power of each of the wavelength components of the amplified spontaneous emission outputted from the add/drop processing unit in the upper stream than the variable attenuator, a second optical power monitor for monitoring the optical power of each of the wavelength components of the amplified spontaneous emission outputted from the add/drop processing unit in the lower stream than the multiplexing unit, a third optical power monitor for monitoring the optical power of each of the wavelength components attenuated by the variable attenuator in the upper stream than the multiplexing unit, and a power equalizing control unit for controlling attenuation quantities of the variable attenuator on the basis of a result of monitoring by the second optical power monitor so that the optical powers of the wavelength components monitored by the second optical power monitor are equalized, and the determining unit may comprise a first determining unit for determining a continuity state of an optical propagation path of each of the wavelength components in the upper stream than the first optical power monitor on the basis of a result of monitoring by the first optical power monitor, and a second determining unit for measuring, from results of monitoring by the first and third optical power monitors, the attenuation quantity of the variable attenuator controlled on the basis of a result of monitoring by the second optical power monitor to determine the continuity state of the optical propagation path of each of the wavelength components in the upper stream than the second optical power monitor and the lower stream than the third optical power monitor on the basis of a result of the measurement.

The add/drop processing unit may be inputted thereto signal beams at respective wavelengths demultiplexed by the wavelength demultiplexing unit through a transmission input port and selectively output each of the signal beams therefrom through either a transmission output port or a drop port, while being inputted thereto, through the add port, a signal beam at a wavelength corresponding to a wavelength of the signal beam outputted through the drop port by a dropping process, and outputting the signal beam therefrom through the transmission output port, and the second control unit may control the add/drop processing unit so that each of the wavelength components of the amplified spontaneous emission outputted from the preamplifier is inputted to the add/drop processing unit through the transmission input port and outputted through the transmission output port.

In this case, preferably, the drop port and said add port are connected to each other at their ends, and the second control unit controls the add/drop processing unit so that each of the wavelength components of the amplified spontaneous emission outputted from the preamplifier is inputted to the add/drop processing unit through the transmission input port, dropped through the drop port, added through the add port, and outputted from the add/drop processing unit through the transmission output port.

In the above optical transmission apparatus, the preamplifier may be comprised of a fiber amplifier which is able to amplify an input beam by means of an optical fiber pumped by a pump beam, and the first control unit may comprise a pump beam supply controlling unit for controlling supply of the pump beam to the optical fiber forming the fiber amplifier, with the wavelength-multiplexed signal beam not inputted, to generate the amplified spontaneous emission.

In which case, the first control unit may comprise a transmission stop requesting unit for requesting a neighboring optical transmission apparatus connected through the input transmission line to stop transmission of the wavelength-multiplexed signal beam through the input transmission line when the pump beam supply controlling unit generates the amplified spontaneous emission, and a response receiving unit for receiving a response that the transmission of the wavelength-multiplexed signal beam from the neighboring optical transmission apparatus has been stopped according to a transmission stop request from the transmission stop requesting unit, and the pump beam supply controlling unit may control supply of the pump beam when the response receiving unit receives the response.

The present invention still further provides a continuity testing method in an optical transmission apparatus having a preamplifier for pre-amplifying a wavelength-multiplexed signal beam inputted through a transmission line, and a wavelength demultiplexing unit for demultiplexing the wavelength-multiplexed signal beam amplified by the preamplifier, which comprises the steps of outputting amplified spontaneous emission from the preamplifier, with the wavelength-multiplexed signal beam not inputted, demultiplexing the amplified spontaneous emission outputted from the preamplifier into wavelengths by the wavelength demultiplexing unit, monitoring an optical power of each of the demultiplexed wavelengths on an optical path on which the amplified spontaneous emission whose wavelengths are demultiplexed by the wavelength demultiplexing unit is propagated, and determining a continuity state of the aid optical path on which the amplified spontaneous emission demultiplexed by the wavelength demultiplexing unit is propagated on the basis of a result of the monitoring.

The present invention still further provides a continuity testing method in an optical transmission apparatus having a preamplifier for pre-amplifying a wavelength-multiplexed signal beam inputted through an input transmission line, a wavelength demultiplexing unit for wavelength-demultiplexing the wavelength-multiplexed signal beam from the preamplifier into wavelengths, an add/drop processing unit for performing an adding/dropping process on a signal beam at each of the wavelengths wavelength-demultiplexed by the wavelength demultiplexing unit, and a multiplexing unit disposed in a lower stream than the add/drop processing unit to wavelength-multiplex signal beams at the respective wavelengths undergone the adding/dropping process and to be outputted through an output transmission path, which comprises the steps of controlling the preamplifier so that amplified spontaneous emission including all wavelength bands to be undergone an output route switching process by the add/drop processing unit is outputted therefrom, with the wavelength-multiplexed signal beam not inputted, controlling the add/drop processing unit so that wavelength components of the amplified spontaneous emission outputted from the wavelength demultiplexing unit are outputted as they are toward the multiplexing unit, monitoring an optical power of each of the wavelength components of the amplified spontaneous emission outputted from the add/drop processing unit, and determining a continuity state of an optical propagation path of each of the wavelength components in an upper stream than a position at which the optical power is monitored, on the basis of a result of monitoring of the optical power of each of the wavelength components of the amplified spontaneous emission.

In this case, the optical power of each of the wavelength components of the amplified spontaneous emission outputted from the add/drop processing unit may be monitored by a first optical power monitor disposed in the upper stream than the multiplexing unit, the continuity state of an optical propagation path of each of the wavelength components in the upper stream than the first optical power monitor may be determined on the basis of a result of monitoring by the first optical power monitor, when the continuity state is determined to be normal as a result of determination of the continuity state on the basis of the result of monitoring by the first optical power monitor, the optical power of each of the wavelength components of the amplified spontaneous emission outputted from the add/drop processing unit may be monitored by a second optical monitor disposed in the lower stream than the multiplexing unit, and the continuity state of an optical propagation path of each of the wavelength components in the upper stream than the second optical power monitor and the lower stream than the first optical power monitor may be determined on the basis of a result of monitoring by the second optical power monitor.

The present invention still further provides an optical transmission system in which a first optical transmission apparatus, which has a preamplifier for pre-amplifying a wavelength-multiplexed signal beam inputted through an input transmission line, a wavelength demultiplexing unit for wavelength-demultiplexing the wavelength-multiplexed signal beam from the preamplifier into wavelengths, an add/drop processing unit for performing an adding/dropping process on signal beams at the respective wavelengths and a multiplexing unit disposed in a lower stream than the add/drop processing unit to wavelength-multiplex signal beams at the respective wavelengths undergone the adding/dropping process and to output through a transmission line, is connected to a second optical transmission apparatus through the input transmission line, the optical transmission system comprising the first optical transmission apparatus comprising a first control unit for controlling the preamplifier so that amplified spontaneous emission including all wavelength bands to be undergone an output route switching process by the add/drop processing unit is outputted, with the wavelength-multiplexed signal beam not inputted from the second optical transmission apparatus, a second control unit for controlling the add/drop processing unit so that wavelength components of the amplified spontaneous emission outputted from the preamplifier under control of the first control unit and wavelength-demultiplexed by the wavelength demultiplexing unit are outputted as they are toward the multiplexing unit, an optical power monitor for detecting an optical power of each of the wavelength components of the amplified spontaneous emission outputted from the add/drop processing unit under control of the second control unit, and a determining unit for determining a continuity state of an optical propagation path of each of the wavelength components in an upper stream than the optical power monitor on the basis of a result of monitoring by the optical power monitor.

In the above optical transmission system, preferably, the preamplifier is comprised of a fiber amplifier which can amplify an input beam by means of an optical fiber pumped by a pump beam, the first control unit of the first optical transmission apparatus comprises a transmission stop requesting unit for requesting the second optical transmission apparatus connected through the input transmission line to stop transmission of the wavelength-multiplexed signal beam through the input transmission line when an amplified spontaneous emission generation controlling unit generates the amplified spontaneous emission, a response receiving unit for receiving a response that transmission of the wavelength-multiplexed signal beam from the second optical transmission apparatus has been stopped according to a transmission stop request from the transmission stop requesting unit, and a pump beam supply controlling unit for controlling supply of the pump beam to the optical fiber forming the fiber amplifier to generate the amplified spontaneous emission when the response receiving unit receives the response, the second optical transmission apparatus comprises a stop request receiving unit for receiving the request from the transmission stop requesting unit, a stopping process unit for stopping transmission of the wavelength-multiplexed signal beam to the first optical transmission apparatus according to the request received by the stop request receiving unit, and a response transmitting unit for transmitting to the first optical transmission apparatus an effect that stopping of the transmission of the wavelength-multiplexed signal beam is completed as a response when said stopping process unit stops the transmission of the wavelength-multiplexed signal beam.

As above, the present invention has an advantage that since amplified spontaneous emission is used as a probe beam for the continuity test under the control of the preamplifier controlling unit and the first control unit, the continuity test on optical propagation paths of all channels that the apparatus can accommodate including a channel not used at the time of a start of the operation can be made easier than the known techniques.

The present invention has another advantage that since it becomes unnecessary to prepare a wavelength tunable laser or the like for the continuity test, the continuity test on optical propagation paths of all channels that the apparatus can accommodate can be made within a shorter time and at a lower cost than the known techniques.

DESCRIPTION OF THE PREFERRED EMBODIMENTS

Hereinafter, embodiments of this invention will be described with reference to the drawings.

Meanwhile, another technical problem, a means for solving the problem and a working function thereof will be made clear by the following embodiments, as well as the above-described objects of this invention.

[A] Description of First Embodiment

Figure 1:
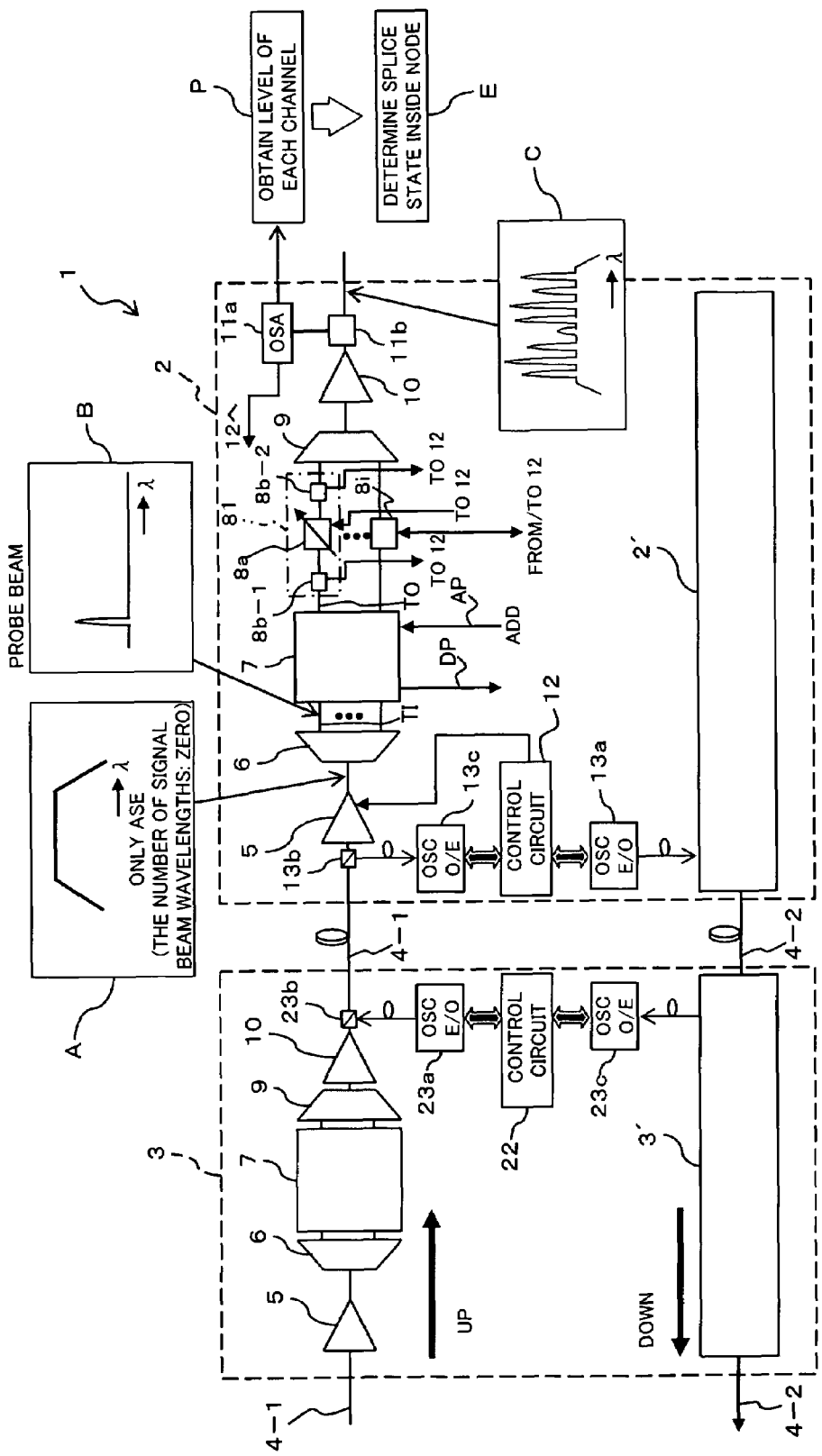
FIG. 1 is a diagram showing an optical transmission system according to a first embodiment of this invention.

[A1] As to Optical Transmission System According to First Embodiment of the Invention FIG. 1 is a diagram showing an optical transmission system 1 according to a first embodiment of this invention. The optical transmission system 1 shown in FIG. 1 is a part of a ring network configuring a WDM network in a metro network, in which two OADM apparatuses (first and second OADM apparatuses 2 and 3) for dropping or adding a wavelength-multiplexed channel are connected in cascade to each other through transmission lines 4-1 and 4-2.

Figure 11:
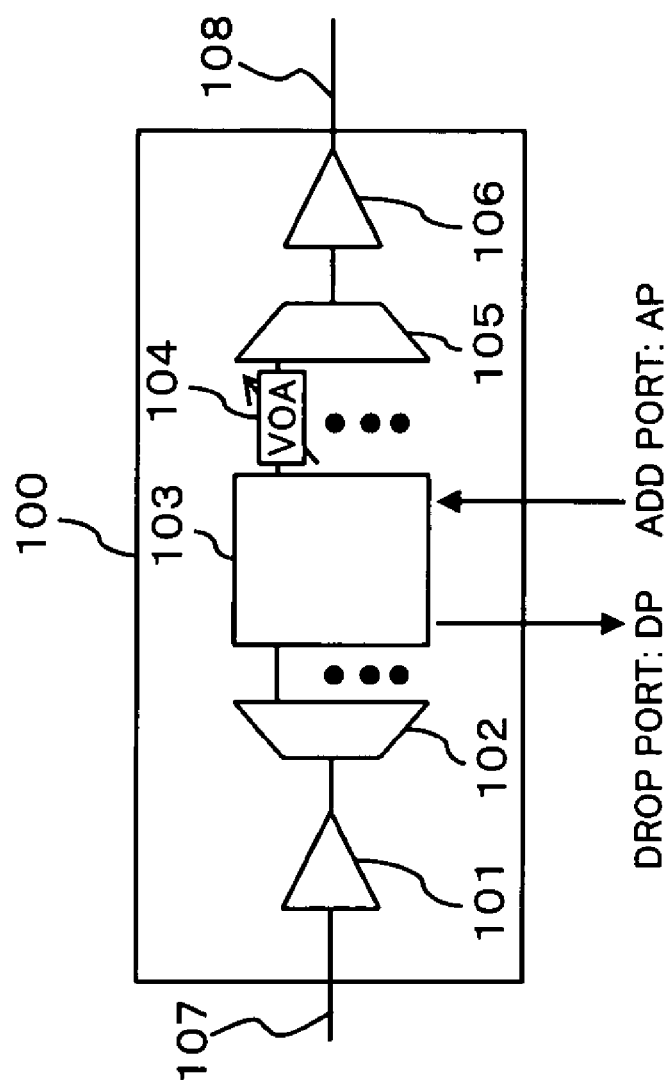
FIG. 11 is a diagram showing a structure of a known OADM node used in a WDM network.

Each of the OADM apparatuses 2 and 3 has an optical add/drop function basically similar to that shown in FIG. 11 described above. However, the first OADM apparatus 2 has a characteristic structure for continuity confirmation of an optical propagation path (that is, a path configured with optical coupling of optical components disposed for each channel in the first OADM apparatus 2) of each channel of a wavelength-multiplexed signal beam. The second OADM apparatus 3 has a structure for operating in cooperation with the first OADM apparatus 2 when performing the continuity confirmation of an optical propagation path of each channel in the first OADM apparatus 2.

For example, when the first OADM apparatus 2 shown in FIG. 1 is incorporated in a ring network, the continuity confirmation can be performed on not only optical propagation paths of channels accommodated when the apparatus is incorporated but also optical propagation paths corresponding to all channels that the first OADM apparatus 2 can accommodate. Owing to this continuity confirmation, it becomes possible to confirm the continuity state of optical components forming the first OADM apparatus 2 as well as the continuity state of connection points of the optical components, on the assumption that the arrangement of the optical components is appropriate.

[A2] As to Structure for Add/Drop Process for Wavelength-Multiplexed Signal Beam First, description will be made of a structure for the add/drop process for a wavelength-multiplexed signal beam in the first and second OADM apparatuses 2 and 3 configuring the optical transmission system 1, focusing on the add/drop process on a wavelength-multiplexed signal beam.

The first OADM apparatus 2 is connected to the second OADM apparatus 3 through the up-link transmission line 4-1 on the input side, and adds or drops a channel of a signal beam of an upstream wavelength-multiplexed signal beam send from the second OADM apparatus 3 through the transmission line 4-1. Similarly, the second OADM apparatus 3 adds or drops a channel of a signal beam of a downstream wavelength-multiplexed signal beam inputted through the up-link transmission line 4-1, configuring the ring network, and outputs the signal beam to the first OADM apparatus 2 on the downstream side.

Each of the first and second OADM apparatuses 2 and 3 can have a structure for the add/drop process on each channel of a signal beam of a wavelength-multiplexed signal beam propagating in the down-link direction, which is opposite to the up-link direction, correspondingly to the structure for the add/drop process on the wavelength-multiplexed signal beam in the up-link direction described above.

In relation with the structure for the add/drop process on the up-link signal beam (signal beam transmitted through the up-link transmission line 4-1), each of the first and second OADM apparatus 2 and 3 has, as optical components, a pre-amplifier 5, an optical wavelength demultiplexing unit 6, an optical crossconnect unit 7, optical attenuating units 81 through 8$n$, a multiplexing unit 9 and a post-amplifier 10. These optical components 5 through 10 are optically coupled in cascade by optical connectors not shown. Incidentally, illustrations of the optical attenuating units 81 through 8$n$ in the second OADM apparatus 3 are omitted in FIG. 1.

Each of the first and second apparatuses 2 and 3 has a structure basically similar to the structure for the add/drop process in the up-link direction described above, as a structure for the add/drop process on a signal beam transmitted through the down-link transmission line 4-2, an illustration of which is omitted (refer to 2' in the first OADM apparatus 2, and 3' in the second OADM apparatus 3).

The pre-amplifier 5 in the first OADM apparatus 2 beforehand amplifies a wavelength-multiplexed signal beam inputted from the second OADM apparatus 3 through the input transmission line 4. The pre-amplifier 5 can be configured with an EDFA (Erbium Doped Fiber Amplifier), which is a fiber amplifier that can amplify an input beam by means of an optical fiber pumped by a pump beam, for example. The pre-amplifier 5 has a function of supplying the pump beam to the EDF, and a GEQ (Gain Equalization) function of controlling the gain of the signal beam amplified by the EDF constant, as well as the EDF, which is an optical fiber configuring the amplification medium.

The optical wavelength demultiplexing unit 6 demultiplexes the wavelength-multiplexed signal beam amplified by the pre-amplifier 5 into optical wavelength components in respective channels, and outputs the demultiplexed signal beams to the optical crossconnect unit 7. The optical wavelength demultiplexing unit 6 can be configured with an AWG (Arrayed Waveguide Gratings) or the like, for example.

The optical crossconnect unit 7 functions as an add/drop processing unit performing the add/drop process on a signal beam at each of wavelengths wavelength-demultiplexed by the optical wavelength demultiplexing unit 6. The optical crossconnect unit 7 has transmission input ports TI to which signal beams at respective wavelengths from the wavelength-demultiplexing unit 6 are inputted, transmission output ports TO each of which leads a signal beam at a corresponding wavelength to a relevant optical propagation path on the output's side, drop ports DP each of which drops (drop process) a signal beam set as a dropped wavelength of signal beams inputted from the transmission input ports TI, and add ports IP each of which adds (add process) a signal beam at a wavelength corresponding to the dropped wavelength to the propagation of the other signal beams to be sent out through the transmission output port TO.

A demultiplexed signal beam at each wavelength (channel) from the optical wavelength demultiplexing unit 6 is inputted through the transmission input port TI disposed for each wavelength, and selectively outputted to either the transmission output port TO leading to the multiplexing unit 9 or the drop port DP. With respect to the wavelength component outputted through the drop port DP in the drop process, a signal beam led in through the add port IP can be outputted from the optical crossconnect unit 7 through the transmission output port TO. Incidentally, settings of the dropped wavelength and the added wavelength can be separately done by means of a control circuit 12 to be described later.

When a wavelength $\lambda 1$ is set as the dropped wavelength, a signal beam at the wavelength $\lambda 1$ wavelength-demultiplexed by the wavelength demultiplexing unit 6 is inputted through the transmission input port TI and outputted through the drop port DP, whereas a signal beam at a corresponding wavelength $\lambda 1$ can be inputted through the add port IP and outputted through the transmission output port TO. Incidentally, as the structure of the optical crossconnect unit 7, the structure described in the Patent Document 1 mentioned above or another known structure may be adopted.

Each of the optical attenuating units 81 through 8n (FIG. 1 shows the optical attenuating unit 81) are inputted thereto a signal beam in a channel through the transmission output port TO as a signal beam to be sent out through the optical transmission line 4 from the optical crossconnect unit 7, and can attenuate the power of the signal beam in the channel so that the power is approximately constant.

For example, the optical attenuating unit 81 attenuates a signal beam at a wavelength λ1 from the optical crossconnect unit 7, whereas the optical attenuating unit 8i (i; 2 to n) attenuates a signal beam at a wavelength λi. Each of the optical attenuating units 81 through 8n has a variable attenuator (VOA) 8a, and a first PD unit 8b-1 on the input side of the variable attenuator 8a and a second PD unit 8b-2 on the output side of the same.

Figure 2:
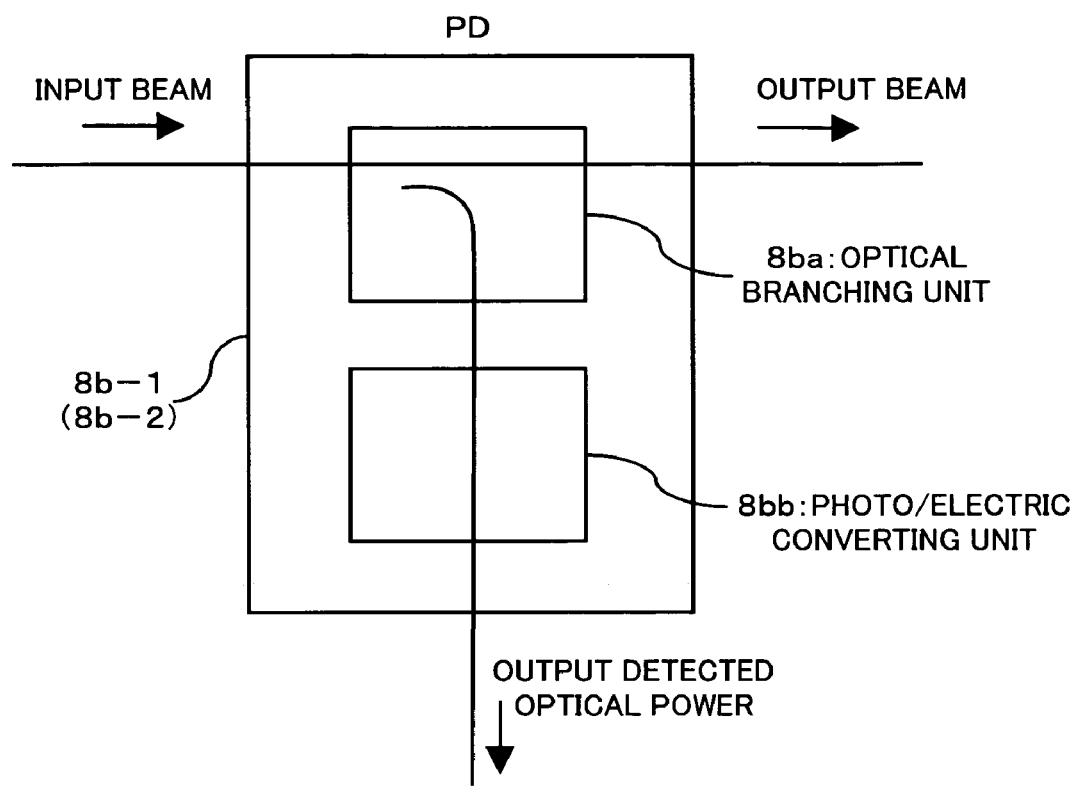
FIG. 2 is a diagram showing a first PD unit or a second PD unit according to the first embodiment of this invention.

Each of the first PD unit 8b-1 and the second PD unit 8b-2 has, as shown in FIG. 2, a branching unit 8ba and a photo/electric converting unit 8bb. The branching unit 8ba branches a signal beam in a wavelength channel from the optical crossconnect unit 7 and outputs the branched signal beam to the photo/electric converting unit 8bb, while outputting the other branched signal beam to the demultiplexing unit 9 in the following stage as it is. The photo/electric converting unit 8bb detects the power of the signal beam branched by the branching unit 8ba, and outputs a result of the detection to the control circuit 12 to be described later.

As above, the first PD unit 8b-1 can detect the power of the signal beam before attenuated by the variable attenuator 8a, whereas the second PD unit 8b-2 can detect the power of the signal beam after attenuated by the variable attenuator 8. The control circuit 12 is inputted thereto the signal beam powers detected by the first and second PD units 8b-1 and 8b-2 configuring each of the optical attenuating units 81 through 8n, and controls the attenuation quantity of the variable attenuator 8a in each of the optical attenuating units 81 through 8n so that the powers of the signal beams outputted from the optical attenuating units 81 through 8n are equalized.

The wavelength multiplexing unit 9 is disposed on an optical path in the lower stream than the optical crossconnect unit 7 via the optical attenuating units 81 through 8n to wavelength-multiplex the signal beams variably attenuated by the respective optical attenuating units 81 through 8n. The multiplexed signal beam is undergone a necessary amplifying process by the post-amplifier 10, then sent out through the transmission line 4 on the output side.

An optical spectrum analyzer (OSA) 11a is inputted thereto a part of the wavelength-multiplexed signal beam amplified by the post-amplifier 10 and to be transmitted through the optical transmission line 4 via the branching unit 11b to detect the optical power of each wavelength spectrum of the inputted wavelength-multiplexed signal beam. Note that this OSA 11a is mainly applied when the continuity test is made on the optical propagation paths of in first OADM apparatus 2, thus can be suitably omitted while the apparatus is in operation.

The control circuit 12 has a function of receiving the control information from an adjacent node apparatus (the second OADM apparatus 3 in this case) over a channel for supervisory control through the up-link or down-link transmission line 4 and notifying the adjacent node apparatus (the second OADM apparatus 3) of the control information, as well as the function of controlling the above optical attenuating units 81 through 8n.

As the function of controlling the variable attenuator 8a by the control circuit 12, a circuit may be structured as a control circuit specialized to control the attenuation quantity of the variable attenuator 8a in each of the optical attenuating units 81 through 8n separately from the function of processing the supervisory control signal, or an exclusive control circuit may be incorporated in each of the optical attenuating units 81 through 8n.

The control information from the control circuit 12 in the first OADM apparatus 2 is converted from an electric signal to an optical signal by the electric/photo converting unit 13a for the optical supervisory channel (OSC), and outputted to the second OADM apparatus 3 through the down-link transmission line 4-2. The light beam of the control information from the second OADM apparatus 3 is converted from an optical signal, branched by the branching unit 13b and send through the up-link transmission line 4-1, converted into an electric signal by the photo/electric converting unit 13c, and received by the control circuit 12 as the control information converted into the optical supervisory control channel.

Correspondingly to the structure of the first OADM apparatus 2, the second OADM apparatus 3 comprises a control circuit 22, an electric/photo converting unit 23a for converting the control information send through the up-link line 4-1 from an electric signal into an optical signal, a multiplexing unit 23b for multiplexing the optical signal from the electric/photo converting unit 23a onto the wavelength-multiplexed signal beam to be transmitted through the transmission line 4-1, and a photo/electric converting unit 23c for converting the light beam from the down-link transmission line 4-2 into an electric signal. Incidentally, illustrations of an optical component in the second OADM apparatus 3 corresponding to the multiplexing unit 23b and an optical component corresponding to the branching unit 13b are omitted in FIG. 1.

In the optical transmission system 1 structured as above, the first and second OADM apparatuses 2 and 3 can perform the drop/add process on wavelength-multiplexed signal beams transmitted through the up-link transmission line 4-1 and the down-link transmission line 4-2, respectively.

The second OADM apparatus 3 drops or adds a channel of a wavelength-multiplexed signal beam send from another upstream optical transmission apparatus not shown through the transmission line 4. The second OADM apparatus 3 can comprise optical components (refer to reference characters 5 through 7, 9, 10, 11a, 11b and 81 through 8n) similar to those of the first OADM apparatus 2. Incidentally, illustrations of the optical attenuating units 81 through 8n are omitted in FIG. 1.

[A3] As to Structure for Continuity Confirmation of Optical Propagation Path of Each Channel in the First OADM Apparatus 2

In the first OADM apparatus 2 according to the first embodiment, it is possible to test the continuity state of each optical propagation path in the first OADM apparatus 2 when the first OADM apparatus 2 as being the above optical transmission system 1 is incorporated in a ring network (namely, when the first OADM apparatus 2 is started to be operated as an OADM node) or suitably as necessary while the first OADM apparatus 2 is operated as the optical transmission system 1. Hereinafter, description will be made of a structure for continuity confirmation of an optical propagation path of each channel in the first OADM apparatus 2, focusing on the up-link optical propagation path.

Figure 3:
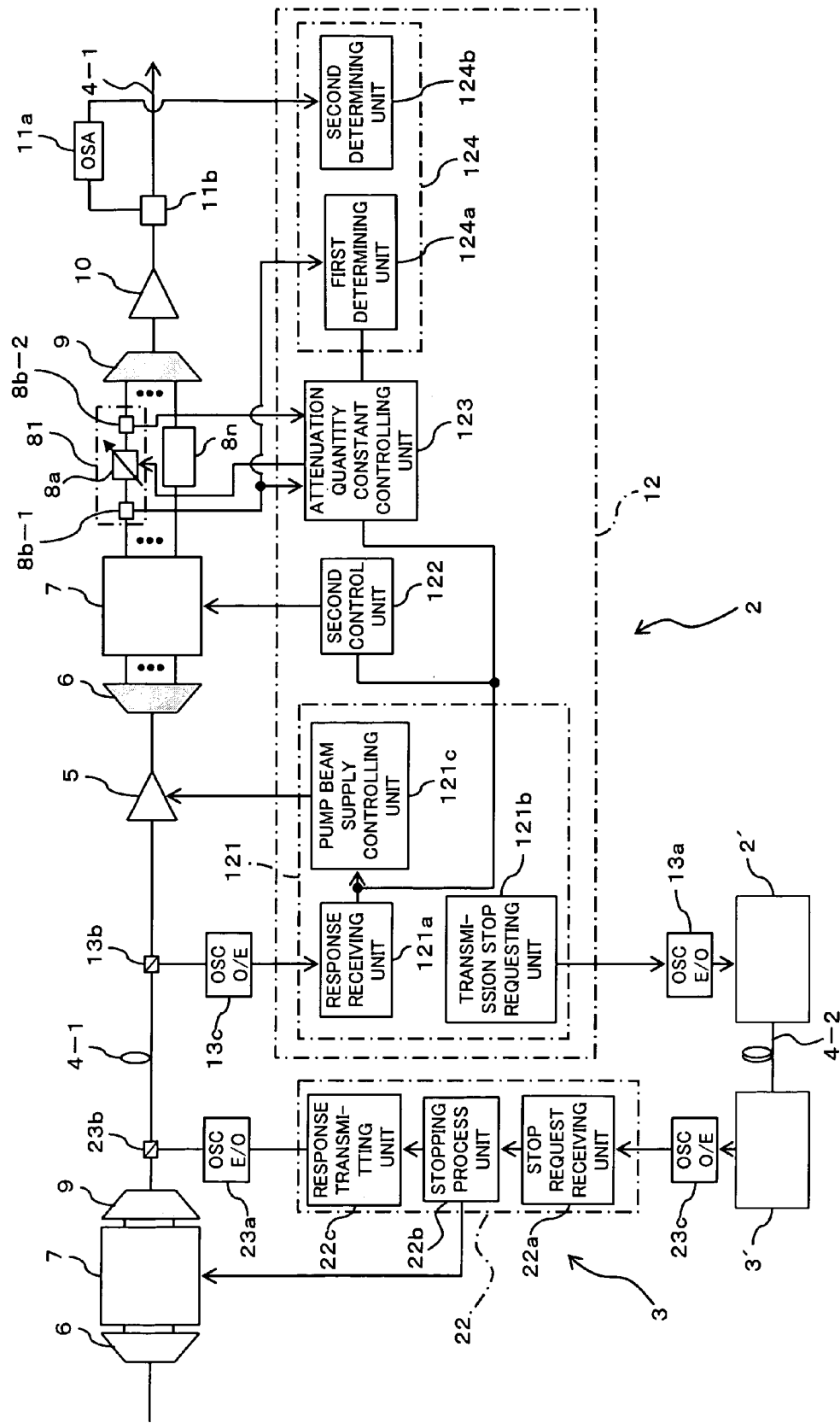
FIG. 3 is a diagram showing a structure for testing the continuity state of an optical propagation path of a first OADM apparatus in the optical transmission system according to the first embodiment of this invention, focusing on an up-link optical transmission path.

FIG. 3 is a diagram showing a structure for testing the continuity state of each optical propagation path in the first OADM apparatus 2 configuring the optical transmission system 1, foucing on the up-link optical propagation path. As shown in FIG. 3, the control circuit 12 of the first OADM apparatus 2 comprises, as a structure for testing the continuity state, a first control unit 121, a second control unit 122, an attenuation quantity constant controlling unit 123 and a determining unit 124.

The first control unit 121 functions as a pre-amplifier controlling unit for controlling the pre-amplifier 5 so that amplified spontaneous emission (ASE) including all wavelength bands of the wavelength-multiplexed signal beam is outputted toward the optical wavelength demultiplexing unit 6, with the wavelength-multiplexed signal beam not inputted from the second OADM apparatus 3 through the up-link transmission line 4-1. The first control unit 121 comprises a response receiving unit 121a, a transmission stop requesting unit 121b and a pump beam supply controlling unit 121c.

The pump beam supply controlling unit 121c controls the pre-amplifier 5 in order that a beam for the continuity test on an optical propagation path in the first OADM apparatus 2 is outputted from the pre-amplifier 5. Namely, the pump beam supply controlling unit 121c performs a control to supply the pump beam to an optical fiber configuring the fiber amplifier, which is the pre-amplifier 5. For example, when an EDFA having an EDF and a pump source not shown is used as a fiber amplifier, the pump beam supply controlling unit 121c controls the pumping source so that the pump beam is supplied to the EDF.

At this time, when the pump beam is supplied to the EDF with the wavelength-multiplexed signal beam from the second OADM apparatus 3 not inputted to the pre-amplifier 5, only the amplified spontaneous emission is outputted. The gain of the amplified spontaneous emission generated in the optical fiber configuring the fiber amplifier is equalized by the GEQ function of this pre-amplifier 5, and is outputted as a beam whose power is approximately equalized.

Figure 4:
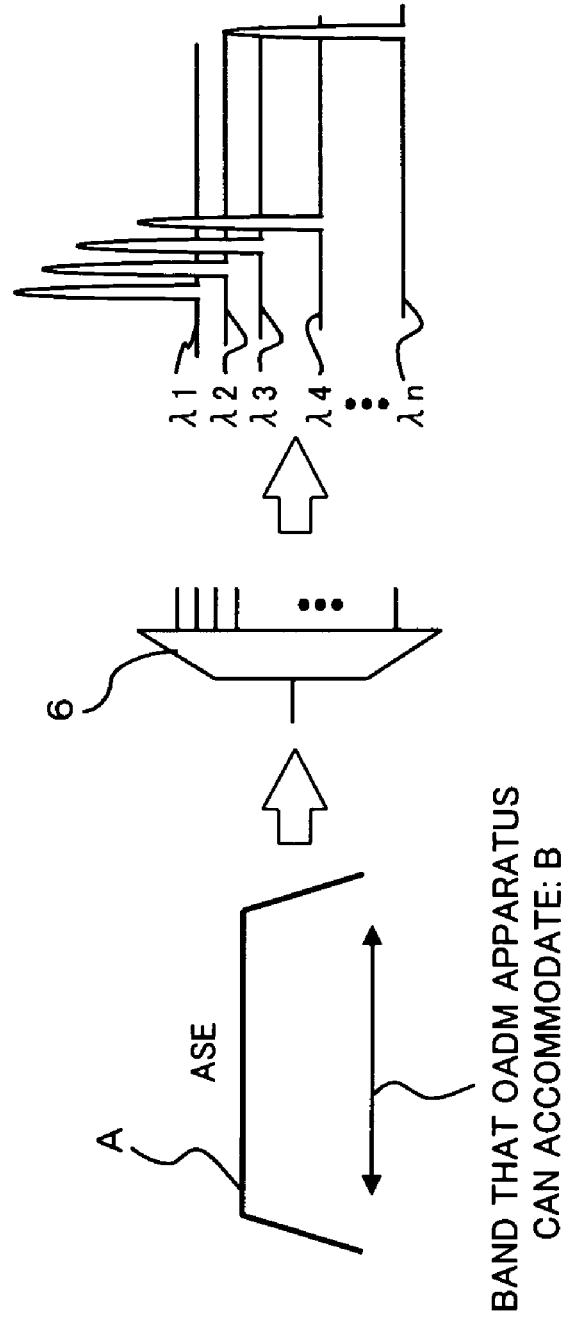
FIG. 4 is a diagram showing a wavelength band of amplified spontaneous emission according to the first embodiment of this invention.

The amplified spontaneous emission whose gain is equalized outputted from the pre-amplifier 5 as above can cover a wavelength band B that the first OADM apparatus 2 can accommodate and can have approximately constant power distribution, as shown A in FIG. 1 and FIG. 4, for example. Accordingly, if a wavelength component beam having the center wavelength corresponding to a certain channel obtained by demultiplexing the amplified spontaneous emission from the pre-amplifier 5 by the wavelength demultiplexing unit 6 is used as the probe beam for the continuity test (refer to B in FIG. 1), it becomes possible to make the continuity test on the optical propagation path of each of all the wavelengths including a wavelength that is not planned to be accommodated at the beginning, which can be accommodated by the first OADM apparatus 2, without a wavelength tunable laser that is heretofore required, but only by means of the pump beam supply control on the pre-amplifier 5.

Since the optical amplifier applied generally to the WDM system has a GEQ (Gain Equalizer) for flattening the wavelength characteristic of the gain, the ASE whose wavelength characteristic is flat inputted to the wavelength demultiplexing unit 6 is suitable for use as a probe beam for detecting the continuity state of the optical propagation path of a wavelength component, particularly the state of the optical connectors on the propagation path. By passing the ASE through the wavelength demultiplexing unit 6, it becomes possible to collectively obtain pseudo light sources having peaks at the center wavelengths of respective channels for the wavelengths, owing to the transmission characteristics of the wavelength demultiplexing unit 6 (refer to $\lambda 1$ through $\lambda n$ in FIG. 4).

The response receiving unit 121a and the transmission stop requesting unit 121b communicate with the second OADM apparatus 3 over the supervisory control channel in order that the wavelength-multiplexed signal beam from the second OADM apparatus 3 on the upper stream side is not inputted to the pre-amplifier 5 in the first OADM apparatus 2 in the previous stage of the control for outputting the amplified spontaneous emission by the above pump beam supply controlling unit 121c.

Concretely, the transmission stop requesting unit 121b requests the second OADM apparatus 3, which is the adjacent optical transmission apparatus connected through the input transmission line 4-1, to stop transmission of the wavelength-multiplexed signal beam through the input transmission line 4-1 when the pump beam supply controlling unit 121c generates the amplified spontaneous emission. The response receiving unit 121a receives a response that the transmission of the wavelength-multiplexed signal beam from the second OADM apparatus 3 is stopped, according to the transmission stop request from the transmission stop requesting unit 121c.

The transmission stop request made from the transmission stop requesting unit 121b to the second OADM apparatus 3 is transmitted over the supervisory control channel on the down-link transmission line 4-2, whereas the response from the second OADM apparatus 3 to be received by the response receiving unit 121a is transmitted over the supervisory control channel on the up-link transmission line 4-1. When the response receiving unit 121a receives a response from the second OADM apparatus 3, the pump beam supply controlling unit 121c starts to control the supply of the pump beam.

The second control unit 122 can set and control the dropped wavelength and the added wavelength in the optical crossconnect unit 7. At the time of the continuity test according to the first embodiment, the second control unit 122 controls the optical crossconnect unit 7 so that all the channels are set to "through" after the above response receiving unit 121a receives the response and the wavelength-multiplexed signal beam through the up-link transmission line 4-1 is stopped.

Namely, the amplified spontaneous emission outputted from the pre-amplifier 5 under control of the first control unit 121 is wavelength-demultiplexed by the wavelength demultiplexing unit 6 into wavelength component beams having the center wavelength components of respective channels as shown by $\lambda 1$ through $\lambda n$ in FIG. 4. At this time, the second control unit 122 controls the optical crossconnect unit 7, whereby the wavelength components of the amplified spontaneous emission are outputted as they are toward the multiplexing unit 9.

In the continuity test according to the first embodiment, the first PD unit 8b-1 detects the optical power of a wavelength component of the amplified spontaneous emission outputted through the optical crossconnect unit 7 before the wavelength components are multiplexed by the multiplexing unit 9, and outputs a result of the detection to the determining unit 124 in the control circuit 12. The OSA 11a is inputted thereto the wavelength-multiplexed beam (refer to C in FIG. 1) obtained at the output end of the first OADM apparatus 2 (at a point from which the wavelength-multiplexed beam is outputted to the up-link transmission line 4-1) via a branching unit 11b, detects the optical power of each of the wavelength components of the wavelength-multiplexed beam after the beams are multiplexed by the multiplexing unit 9, and outputs a result of the detection to the determining unit 124.

The first PD unit 8b-1 and the OSA 11a are together structured as an optical power monitor for detecting the optical power of a wavelength component of the amplified spontaneous emission outputted from the optical crossconnect unit 7 under control of the second control unit 122. The first PD unit 8b-1 is structured as a first optical power monitor for monitoring the optical power in the upper stream than the multiplexing unit 9, whereas the OSA 11a is structured as a second power monitor for monitoring the optical power in the lower stream than the multiplexing unit 9.

The determining unit 124 determines the continuity state of the optical propagation path of each of the wavelength components on the basis of a result of the monitoring by the first PD unit 8b-1 and the OSA 11a, which together configure the optical power monitor. The determining unit 124 comprises a first determining unit 124a for determining the continuity state of the optical propagation path of each of the wavelength components in the upper stream than the first PD unit 8b-1 on the basis of a result of the monitoring by the first PD unit 8b-1, and a second determining unit 124b for determining the continuity state of the optical propagation path of each of the wavelength components in the upper stream than the OSA 11a on the basis of a result of the monitoring by the OSA 11a.

The second PD unit 8b-2 is structured as a third power monitor for monitoring the optical power of the wavelength component attenuated by the variable attenuator 8a in the upper stream than the multiplexing unit 9 when the pre-amplifier 5 outputs the amplified spontaneous emission. Namely, the attenuation quantity constant controlling unit 123 in the control circuit 12 controls the variable attenuator 8a on the basis of the monitoring by the first and the second PD units 8b-1 and 8b-2 so that the attenuation quantity of the wavelength component of the variable attenuator 8a becomes constant.

When the first determining unit 124a determines that the continuity state of the propagation path of each of the wavelengths components in the upper stream than the first PD unit 8b-1 is excellent, it is assumed that the optical powers of the wavelength components of the amplified spontaneous emission inputted to the first PD units 8b-1 are equalized because the optical powers of the wavelength components of the amplified spontaneous emission outputted from the pre-amplifier 5 are equalized. Since the optical attenuating units 81 through 8n attenuate a constant attenuation quantity from the wavelength components, it is assumed that the optical powers of the amplified spontaneous emission outputted from the optical attenuating units 81 through 8n are equalized.

When the continuity state of the optical propagation paths of the wavelength components in the upper stream than the first PD unit 8b-1 is excellent, the optical powers of the wavelength components outputted to the multiplexing unit 9 from the branching units 8ba configuring the second PD units 8b-2 in the optical attenuating units 81 through 8n are constant under control of the attenuation quantity constant controlling unit 123 on the variable attenuators 8a configuring the optical attenuating units 81 through 8n. For this, the second determining unit 124b can determine the continuity state in the upper stream than the second PD unit 8b-2.

In other words, the first determining unit 124a can determine the continuity state of the optical propagation path of each of the wavelength components in the lower stream than the pre-amplifier 5 and the upper stream than the first PD unit 8b-1. The second determining unit 124b can determine the continuity state of the optical propagation path of each of the wavelength components in the upper stream than the branching unit 11b to which the beam to be inputted to the OSA 11a is led and the lower stream than the second PD unit 8b-2.

The control circuit 22 of the second OADM apparatus 3 comprises a stop request receiving unit 22a for receiving a transmission stop request from the transmission stop requesting unit 121b in the first OADM apparatus 2 over the supervisory control channel on the down-link transmission path 4-2, a stopping process unit 22b for stopping the transmission of the wavelength-multiplexed signal beam to the first OADM apparatus 2 according to the request received by the stop request receiving unit 22a, and a response transmitting unit 22c for transmitting an effect that the stopping process unit 22b completes the stopping of the transmission of the wavelength-multiplexed signal beam to the first OADM apparatus 2 as a response over the supervisory control channel on the up-link transmission path 4-1.

The stopping process unit 22b shuts off the signal beam outputted from the optical crossconnect unit 7 in the second OADM unit 3 through the transmission output port under control, thereby stopping the transmission of the wavelength-multiplexed signal beam to the first OADM apparatus 2. When the response receiving unit 121a in the first control unit 121 in the first OADM apparatus 2 receives a response transmitted from the response transmitting unit 22c, the pump beam supply controlling unit 121c performs the output control of the ASE beam on the pre-amplifier 5 in order to start the operation for the continuity test on the optical propagation path, as described before.

[A4] Description of Operation of Continuity Test on Optical Propagation Path of Each Channel in First OADM Apparatus 2

Figure 5:
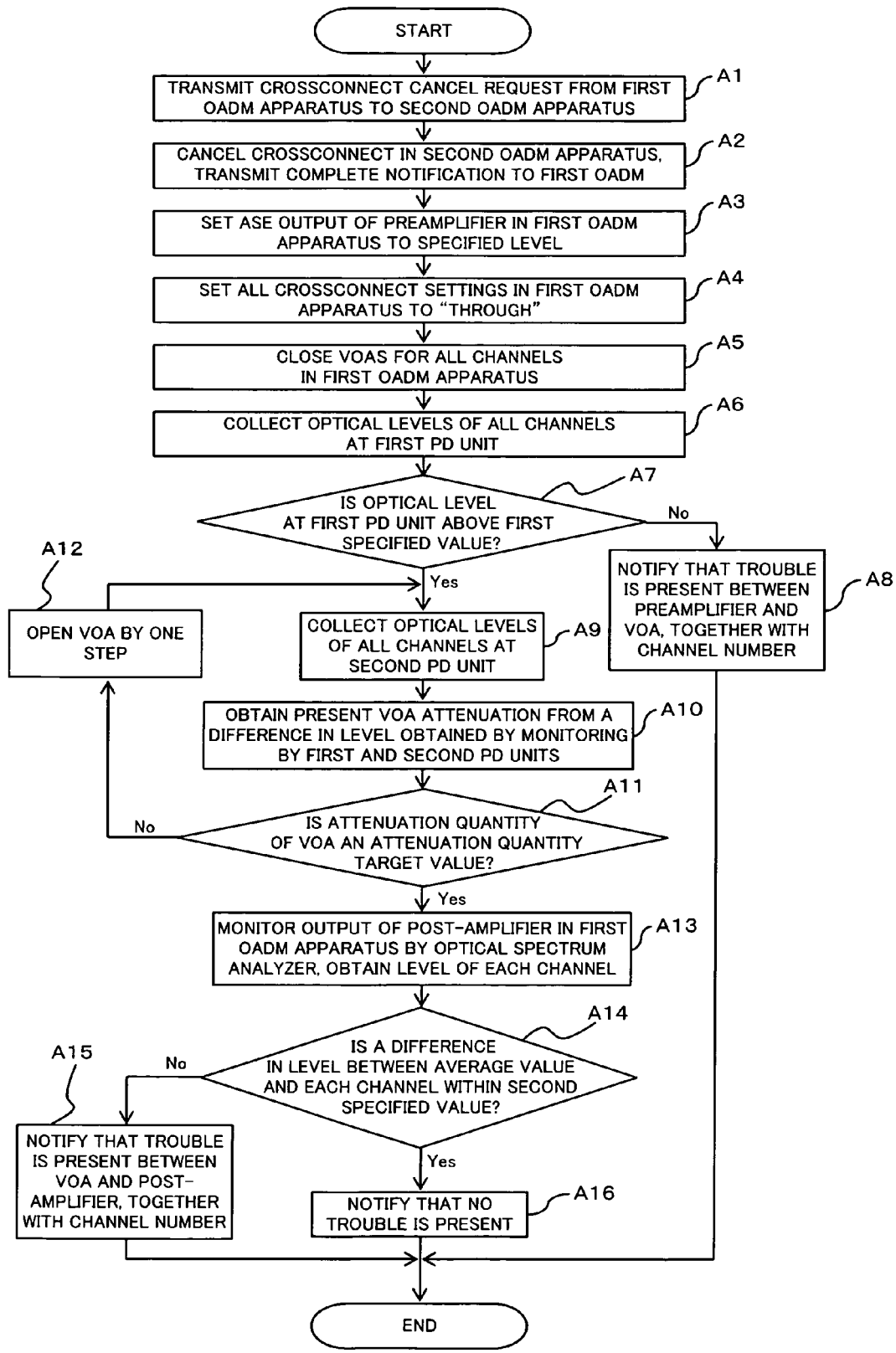
FIG. 5 is a flowchart for illustrating an operation for the continuity test on an optical propagation path of each channel of the first OADM apparatus according to the first embodiment of this invention.

In the first OADM apparatus 2 with the above structure according to the first embodiment, the continuity test on the optical propagation path of each channel is made, as shown in a flowchart in FIG. 5, for example.

First, the transmission stop requesting unit 121b in the first control unit 121 requests the second OADM apparatus 3 to stop the transmission of the wavelength-multiplexed signal beam. In concrete, the first OADM apparatus 2 transmits a crossconnect cancel request to the second OADM apparatus 3 (step A1).

In the control circuit 22 in the second OADM apparatus 3, the stopping process unit 22b cancels the crossconnect unit 7 to make the number of wavelengths to be "through" zero according to the crossconnect cancel request received by the stop request receiving unit 22a, thereby shutting off the output of the wavelength-multiplexed signal beam to the first OADM apparatus 2. After that, the response transmitting unit 22c outputs a complete notification to the first OADM apparatus 2 (step A2).

In the first control unit 121 in the first OADM apparatus 2, when the response receiving unit 121a receives a response that shutting off of the transmission of the wavelength-multiplexed signal beam is completed, the pump beam supply controlling unit 121c controls the pre-amplifier 5 so that the amplified spontaneous emission including all wavelength bands to be undergone the output route switching process by the crossconnect unit 7 is outputted, with the wavelength-multiplexed signal beam not inputted.

By closing the transmission output ports of the optical crossconnect unit 7 in the second OADM apparatus 3 in the upper stream as above, the ASE beam outputted from the pre-amplifier 5 does not include the main signal beam. With respect to the level of the amplified spontaneous emission, the GEQ function of the pre-amplifier 5 allows the amplified spontaneous emission to have a predetermined level beforehand set over all the channel bands that can be accommodated (step A3).

The second control unit 122 controls the optical crossconnect unit 7 so that each of the wavelength components of the amplified spontaneous emission outputted from the pre-amplifier 5 and wavelength-demultiplexed by the wavelength demultiplexing unit 6 is outputted as it is toward the multiplexing unit 9. In concrete, all the channels in the optical crossconnect unit 7 are set "through" (step A4). All the variable attenuators 8a in the optical attenuating units 81 through 8n are set "close" to prevent the ASE beam as being the probe beams from leaking to the multiplexing unit 9 in the lower stream (step A5).

When the pump beam supply control on the pre-amplifier 5, and the setting of the optical crossconnect unit 7 and the setting of the variable attenuators 8a in the optical attenuating units 81 through 8n are completed, the first determining unit 124a collects the optical levels (step A6). Incidentally, the pump beam supply control on the pre-amplifier 5 and the settings of the optical crossconnect unit 7 and the variable attenuators 8a in the optical attenuating units 81 through 8n may be performed in the order other than that performed in the first embodiment.

The first PD unit 8b-1 in each of the optical attenuating units 81 through 8n monitors the optical power of a corresponding wavelength component of the amplified spontaneous emission outputted from the optical crossconnect unit 7. The first determining unit 124a in the determining unit 124 determines the continuity state of the optical propagation path of each of the wavelength components in the upper stream than a position where the optical power is monitored.

Namely, the first determining unit 124a determines whether the optical level of each of the wavelength components is larger than a first specified value beforehand set for the optical level of each wavelength component. When determining that any one of the wavelength components is smaller than the specified value, the first determining unit 124a notifies that the continuity of the optical propagation path (a path in the lower stream than the pre-amplifier 5 and in the upper stream than the first PD unit 8b-1) of the wavelength component that is smaller than the first specified value is abnormal, together with a channel number thereof, as a result of the continuity test (from NO route at step A7 to step A8).

Namely, the first determining unit 124a determines that a channel whose optical level is not above the specified value at the first PD unit 8b-1 has a large loss portion between the pre-amplifier 5 and the first PD unit 8b-1, notifies of it, and terminates the continuity test.

When the first determining unit 124a determines that abnormality occurs as a result of the continuity test, a position causing the abnormality can be specified to an optical propagation path of the relevant channel. For example, when it is determined that abnormality occurs in a channel of a wavelength λ1, the position where the abnormality occurs can be specified to an optical propagation path of the wavelength λ1 in the lower stream than the pre-amplifier 5 and the upper stream than the optical attenuator 81.

In this case, contamination and the like of an optical connector disposed on a path leading the wavelength component λ1 demultiplexed by the wavelength demultiplexing unit 6 to a corresponding input port of the optical crossconnect unit 7 and an optical connector connecting the optical crossconnect unit 7 to the optical attenuator 81 are examined.

When it is determined, on the basis of comparison between each result of the monitoring from the first PD unit 8b-1 with the above first specified value, that the optical levels of all the wavelength components are larger than the first specified value, it is determined that the continuity of each of the optical propagation paths in the upper stream than the first PD unit 8b-1 is normal, and that the loss state particularly caused by an optical connector or the like is within the normal range (YES route at step A7).

When the first determining unit 124a determines that a result of the monitoring from the first PD unit 8b-1 is normal as above, the attenuation quantity constant controlling unit 123 then controls the optical attenuating units 81 through 8n.

The attenuation quantity constant controlling unit 123 collects results of the monitoring from the first PD units 8b-1 in the optical attenuating units 81 through 8n and results of the monitoring from the second PD units 8b-2 (step A9) On the basis of the collected results of the monitoring, the attenuation quantity constant controlling unit 123 obtains the present attenuation quantity in each of the optical attenuating units 81 through 8n (step A10).

The attenuation quantity constant controlling unit 123 determines whether the obtained attenuation quantity of each of the optical attenuating units 81 through 8n is larger than an attenuation quantity target value beforehand set (step A11). When the obtained attenuation quantity does not reach the attenuation quantity target value, the attenuation quantity constant controlling unit 123 performs the feedback control so as to increase the attenuation quantity in the variable attenuator 8a of a corresponding optical attenuating unit 81, 82 . . . or 8n by a control quantity of one step (unit control quantity) (step A12).

The attenuation quantity constant controlling unit 123 increases the attenuation quantity by the one step control quantity at a time until the attenuation quantity obtained on the basis of the result of the monitoring from the first PD unit 8b-1 and the second PD unit 8b-2 reaches the above attenuation quantity target value (refer to a control loop formed with NO route at step A11, step A12, step A9 and step A10). When the attenuation quantity of the variable attenuator 8a reaches the attenuation quantity target value, the attenuation quantity constant controlling unit 123 terminates the feedback control and fixes the attenuation quantity in this state (VOA lock-up).

Namely, it can be said that the optical powers of the wavelength components of the amplified spontaneous emission as being the probe beams before inputted to the first PD unit 8b-1 are equalized when it is determined that a result of the determination by the first determining unit 8b-1 is normal. Accordingly, the attenuation quantity is fixed to the constant attenuation quantity target value in each of the optical attenuating unit 81 through 8n, whereby the powers of the wavelength components of the amplified spontaneous emission outputted from the optical attenuating units 81 through 8n are approximately equalized.

When the attenuation quantity in each of the optical attenuating units 81 through 8n is controlled to be constant as above (YES route at step A11), the continuity test is made on the optical propagation path in the lower stream than the second PD unit 8b-2 on the basis of a result of the monitoring by the OSA 11a. In concrete, the second determining unit 124b obtains a result of monitoring of the optical power of each of the wavelength components, multiplexed by the multiplexing unit 9 and amplified by the post-amplifier 10, from the OSA 11a disposed in the lower stream than the multiplexing unit 9 (refer to step A13, and D in FIG. 1).

The second determining unit 124b obtains an average power of all the channels on the basis of the obtained optical power of each of the wavelength components, and determines whether a difference between the obtained average power and the optical power of each of the wavelength components is within the second specified value beforehand determined (refer to step A14, and E in FIG. 1).

When the difference between the optical power of any one of the wavelength components and the average power is outside the range of the second specified value, the second determining unit 124b notifies that abnormality occurs in an optical transmission path of a relevant wavelength component as a result of the continuity test, together with a channel number of this wavelength component (NO route at step A14 to step A15). When the difference between the optical power of each of all the wavelength components and the average value is within the second specified value, the second determining unit 124b notifies that no abnormality occurs as a result of the continuity test (from YES route at step A14 to step A16).

When it is determined that abnormality occurs as a result of the continuity test, the connection state of an optical connector inside the first OADM apparatus 2 is first checked. For example, it is determined that abnormality occurs in a channel of the wavelength λ1, an optical connector connecting the optical attenuator 81 to the multiplexing unit 9 is checked.

Why the continuity test is possible on each of the optical propagation paths in the downstream than the second PD unit 8b-2 excepting the inside of the optical attenuators 81 through 8n is that the effect of the loss of the optical connectors connecting the optical components 8b-1, 8b-2 and 8a configuring each of the optical attenuators 81 through 8n is prevented by the attenuation quantity setting control by the optical attenuator itself 81, 82, . . . or 8n.

The first embodiment of this invention has an advantage that the continuity test on optical propagation paths through optical components disposed for communications over all channels, which can be accommodated, including a channel that is not used at the time of the initial operation can be made easier than the known techniques because the control circuit 12 uses the ASE beam as the probe beam under control thereof.

Another advantage of this embodiment is that the continuity test on optical propagation paths of all channels which can be accommodated can be made in a shorter time and at a lower cost than the known techniques because it becomes unnecessary to prepare a wavelength tunable laser or the like for the continuity test.

Meanwhile, the above first and second specified values may be set to values with which it can be determined whether any hindrance occurs in the optical connections on at least an optical propagation path to be tested on the basis of the normal continuity performance of the optical propagation path whose continuity state is to be determined by the first determining unit 124a and the second determining unit 124b.

[B] Description of Second Embodiment

Figure 6:
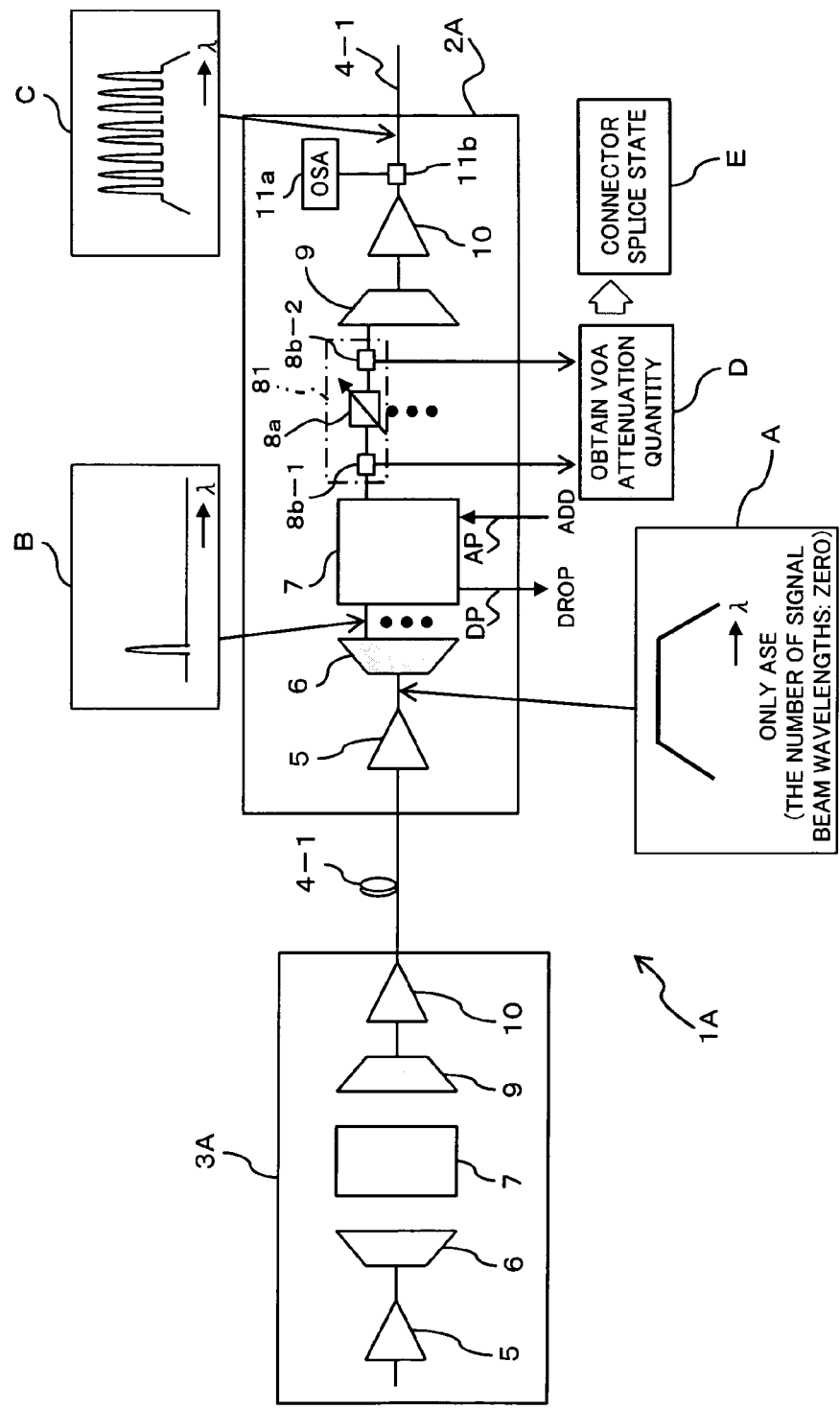
FIG. 6 is a diagram showing an optical transmission system according to a second embodiment of this invention.

[B1] As to Optical Transmission System According to Second Embodiment of the Invention FIG. 6 is a diagram showing an optical transmission system 1A according to a second embodiment of this invention. As compared with the optical system 1 described above according to the first embodiment, the optical transmission system 1a shown in FIG. 6 is similar to that according to the first embodiment in that two OADM apparatuses (a first and a second OADM apparatuses 2A and 3A) are connected in cascade to each other through the up-link or down-link transmission line 4-1 or 4-2, but different from that according to the first embodiment in that the structure for the continuity test to be made in the first OADM apparatus 2A, and the mode of the same are different from those according to the first embodiment. Incidentally, an illustration of the structure for the add/drop process for a beam propagating through the down-link transmission line 4-2 is omitted in FIG. 6.

According to the second embodiment, when the first OADM apparatus 2A is incorporated in a ring network to configure the optical transmission system 1A (namely, the first OADM apparatus 2A is started to be operated as an OADM node), it is possible to suitably test the continuity state of an optical propagation path in the first OADM apparatus 2A during the operation of the optical transmission system 1A as needed, but the method of the test and the structures of the first and second OADM apparatuses 2A and 3A are different from those according to the first embodiment.

[B2] As to Structure for Continuity Confirmation of Optical Propagation Path of Each Channel in First OADM Apparatus 2A The first OADM apparatuses 2A and the second OADM apparatus 3A have optical components (refer to reference characters 5 through 7, 9, 10, 11a, 11b and 81 through 8n) basically similar to those of the apparatuses 2 and 3 according to the above first embodiment. However, the first OADM apparatus 2A has a control circuit 12A different from that according to the first embodiment. The second OADM apparatus 3A has a control circuit 22A different from that according to the first embodiment. Hereinafter, description will be made of a structure of the control circuit 12A for making the continuity confirmation of an optical propagation path of each channel in the first OADM apparatus 2A with reference to FIG. 7, focusing on the up-link optical propagation path. Incidentally, like reference characters in FIGS. 6 and 7 designate like or corresponding parts in FIGS. 1 and 3.

Figure 7:
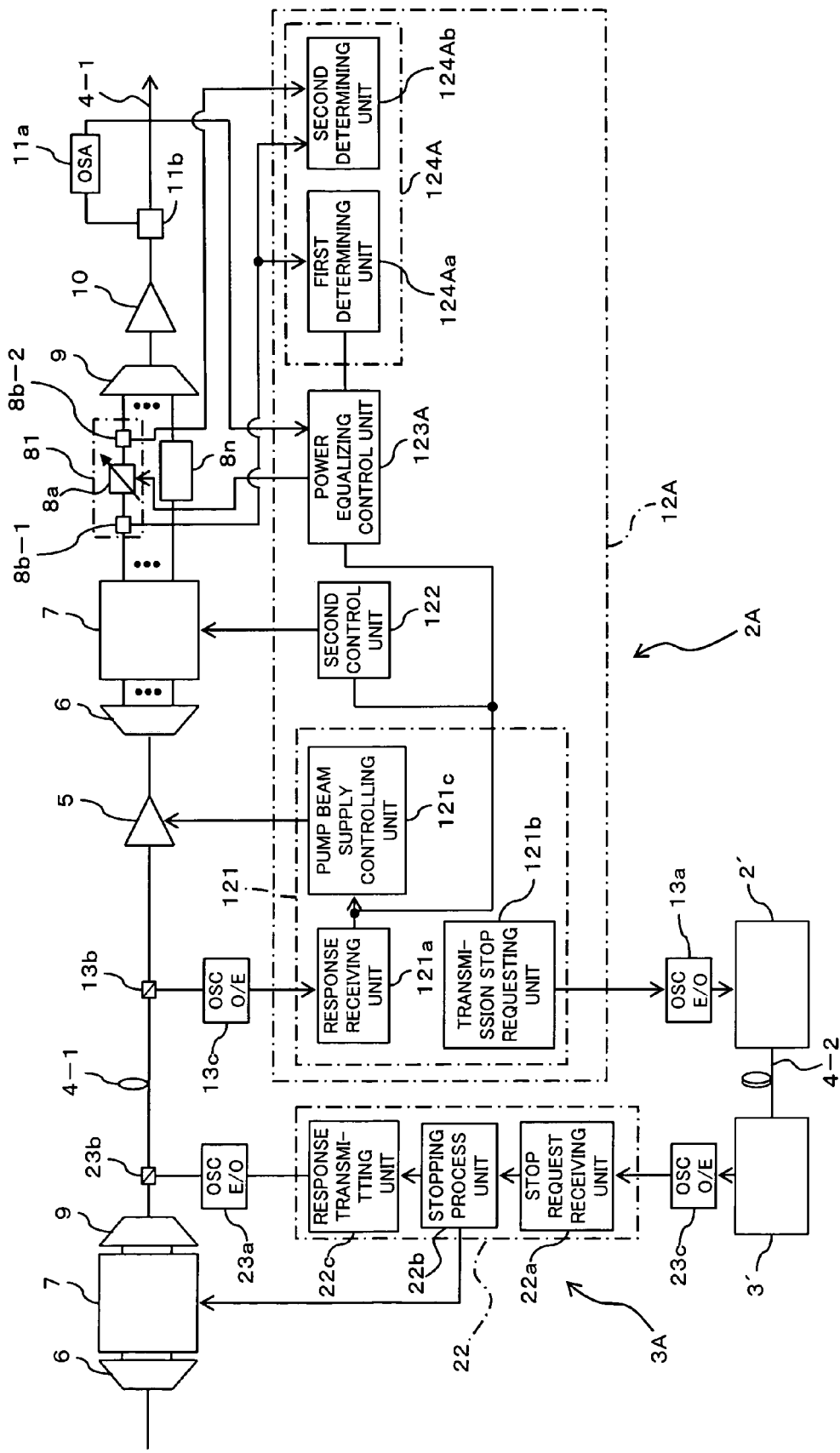
FIG. 7 is a diagram showing a structure for testing the continuity state of an optical propagation path of a first OADM apparatus in an optical transmission system according to the second embodiment of this invention, focusing on an up-link optical propagation path.

As shown in FIG. 7, the control circuit 12A in the first OADM apparatus 2A comprises a first control unit 121 and a second control circuit 122 similar to those shown in FIG. 3, along with a power equalizing control unit 123A and a determining unit 124A for the purpose of a test of the continuity state on the up-link optical propagation path in the first OADM apparatus 2A. The second OADM apparatus 3A comprises a control circuit 22A similar to that shown in FIG. 3.

When a response receiving unit 121a in the first control unit 121 receives a response that transmission of a wavelength-multiplexed signal beam from the second OADM apparatus 3 is stopped, the power equalizing control unit 123A controls optical attenuating units 81 through 8n so that the optical powers of wavelength components of amplified spontaneous emission outputted from a post-amplifier 10 are equalized. In concrete, the power equalizing control unit 123A controls the attenuation quantities of the variable attenuators 8a in the optical attenuating units 81 through 8n on the basis of a result of monitoring fed from an OSA 11a which is the second power monitor so that the optical powers of the wavelength components monitored by the OSA 11a are equalized.

The determining unit 124A determines the continuity state of an optical propagation path of each of the wavelength components on the basis of results of monitoring by a first PD unit (first power monitor) 8b-1 and a second PD unit (third power monitor) 8b-2, each of which configures an optical power monitor. The determining unit 124A comprises a first determining unit 124Aa for determining the continuity state of an optical propagation path of each of the wavelength components in the upper stream than the first PD unit 8b-1 on the basis of a result of monitoring fed from the first PD unit 8b-1, and a second determining unit 124Ab for determining the continuity state of an optical propagation path of each of the wavelength components in the lower stream than the second PD unit 8b-2 on the basis of a result of monitoring fed from the second PD unit 8b-2.

Namely, the first determining unit 124Aa is similar to that (reference character 124a) according to the first embodiment described above. Unlike the second determining unit (reference character 124b) according to the first embodiment, the second determining unit 124Ab determines the continuity state of an optical propagation path of each of the wavelength components in the lower stream than the second PD unit 8b-2 on the basis of results of the monitoring fed from the first PD unit 8b-1 and the second PD unit 8b-2 when the first determining unit 124Aa determines that the continuity of all the optical propagation paths of the wavelength components in the upper stream than the first PD unit 8b-1 are normal.

In concrete, the second determining unit 124Ab measures the attenuation quantity of each of the variable attenuators 8a controlled on the basis of a result of monitoring by the OSA 11a, which is a second optical power monitor, from results of monitoring by corresponding first and second PD units 8b-1 and 8b-2. On the basis of a result of this measurement, the second determining unit 124Ab can determine the continuity state of an optical propagation path of each of the wavelength components in the upper stream than the branching unit 11b and the lower stream than the second PD unit 8b-2.

Since the optical powers of the wavelength components of the amplified spontaneous emission outputted from the pre-amplifier 5 are equalized, it can be said that the optical powers of the wavelength components of the amplified spontaneous emission outputted from the first PD units 8b-1 to the variable attenuators 8a are equalized when the first determining unit 124Aa determines that the continuity of all the optical propagation paths of the wavelength components in the upper stream than the first PD units 8b-1 is normal.

For this, it is considered that a wavelength component which has an attenuation quantity smaller than a specified value in the variable attenuator 8a, with the attenuation quantity for each of the wavelength components controlled by the power equalizing unit 123A on the basis of a result of the monitoring by the OSA 11a, has a smaller optical power inputted to the OSA 11a. Accordingly, the attenuation quantity in the variable attenuator 8a is obtained from results of monitoring by the corresponding first and second PD units 8b-1 and 8b-2. When there is any wavelength component having the attenuation quantity smaller than the specified value, it can be determined that abnormality occurs in the optical propagation path of that wavelength component in the downstream than the corresponding PD unit 8b-2.

Figure 8:
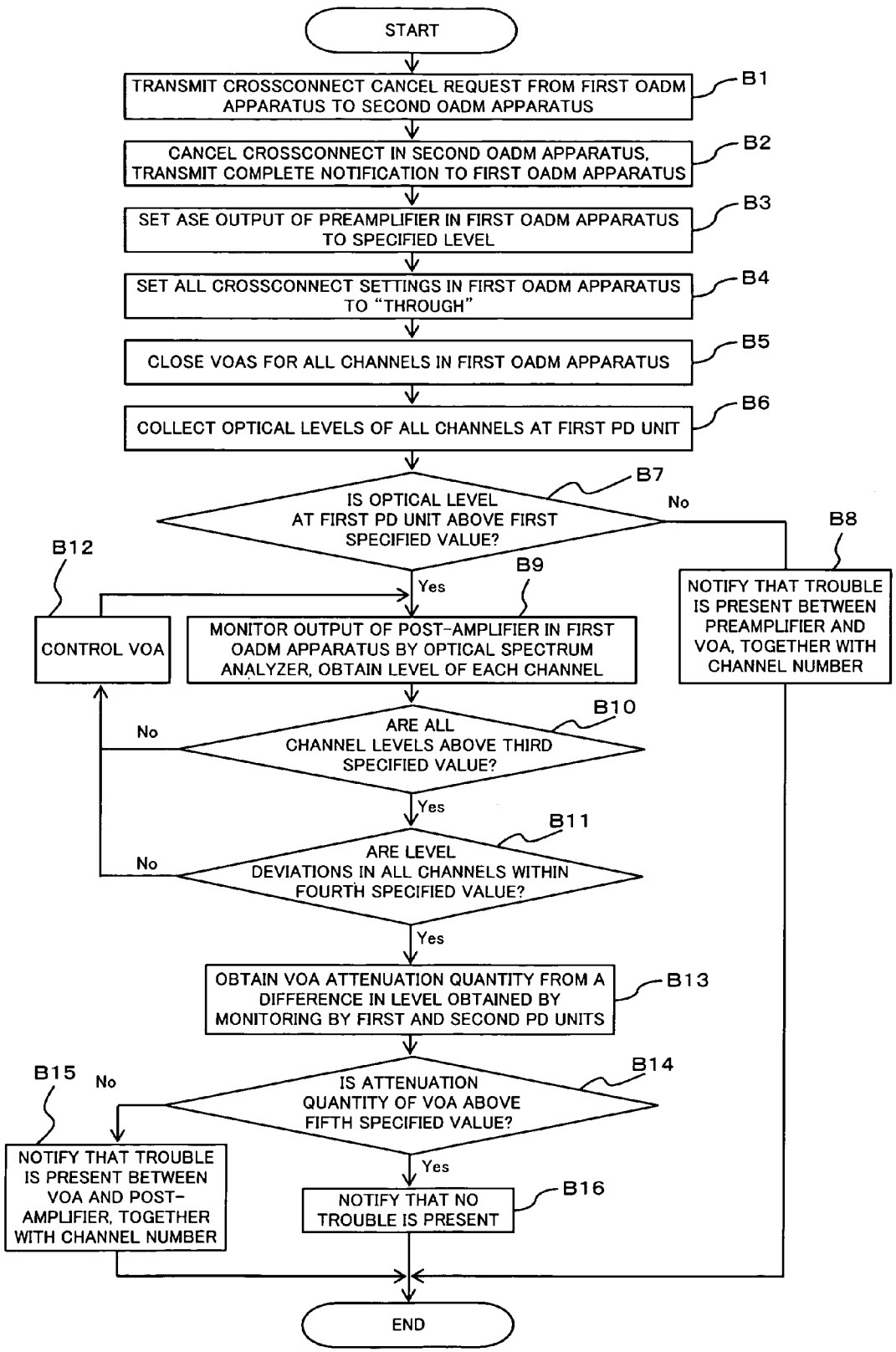
FIG. 8 is a flowchart for illustrating an operation for the continuity test on each channel of the first OADM apparatus according to the second embodiment of this invention.

[B3] Description of Operation for Continuity Test on Optical Propagation Path of Each Channel in First OADM Apparatus 2A In the first OADM apparatus 2A structured as above according to the second embodiment, the continuity test on an optical propagation path of each channel is made, as shown in a flowchart in FIG. 8, for example.

Like the first embodiment described above, the continuity of an optical propagation path in the upper stream side than the first PD unit 8b-1 in each of the optical attenuating units 81 through 8n is tested by using amplified spontaneous emission (refer to A in FIG. 6) outputted from the pre-amplifier 5, with the wavelength-multiplexed signal beam from the second OADM apparatus 3A not inputted (steps B12 through B8 corresponding to steps A1 through A8 in FIG. 5, respectively).

At this time, the amplified spontaneous emission from the pre-amplifier 5 can cover wavelength bands that the first OADM apparatus 2A can accommodate, and can have approximately constant power distribution, like the first embodiment. Accordingly, use of a wavelength component beam (refer to B in FIG. 6) having the center wavelength corresponding to each channel obtained by demultiplexing the amplified spontaneous emission from the pre-amplifier 5 by the wavelength demultiplexing unit 6 as the probe beam for the continuity test enables a simpler continuity test on an optical propagation path of each of all the wavelengths that the first OADM apparatus 2A can accommodate including a wavelength that is not planned to be accommodated at the beginning, not only without a wavelength tunable laser which is heretofore required but also with the pump beam supply control on the pre-amplifier 5.

The first determining unit 124Aa determines whether the optical level of each of the wavelength components is larger than a first specific value beforehand set on the basis of a result of monitoring fed from the first PD unit 8b-1. When determining that any one of the wavelength components is smaller than the first specific value, the first determining unit 124Aa determines that abnormality occurs in an optical propagation path (a path in the lower stream than the pre-amplifier 5 and the upper stream than the first PD unit 8b-1) of the wavelength component having an optical level smaller than the first specific value, and notifies of it, together with the channel number, as a result of the continuity test (from NO route at step B7 to step B8).

Namely, the first determining unit 124Aa determines that a large loss is present between the pre-amplifier 5 and the first PD unit 8b-1 in a channel having an optical level at the first PD unit 8b-1 not larger than the specific value, notifies of it, and terminates the continuity test.

When the first determining unit 124Aa determines that the optical levels of all the wavelength components are above the first specific value, the power equalizing control unit 123A starts to control the optical attenuating units 81 through 8n (a control loop formed with step B9 through B12).

The OSA 11a in the first OADM apparatus 2A monitors the output of the post-amplifier 10 to obtain optical power information on each channel, and outputs the obtained optical power information on each channel as a result of the monitoring to the power equalizing control unit 123A (step B9). Namely, the optical power of each of the wavelength components of the amplified spontaneous emission wavelength-multiplexed by the multiplexing unit 9 and amplified by the post-amplifier 10 is obtained by the OSA 11a.

The power equalizing control unit 123A controls the variable attenuators 8a in the optical attenuating units 81 through 8n so that the optical components of all channels including a wavelength component of a channel that is not planned to be accommodated by the first OADM apparatus 2A at the beginning are above a third specified value (step B10), and that level deviations among all the channels are within a fourth specific value (step B11), thereby equalizing the powers of the probe beam components of all the channels outputted from the post-amplifier 10 (step B12, refer to C in FIG. 6).

When the optical components of all the channels become above the third specified value and the level deviations among all the channels become within the fourth specified value by controlling the optical attenuating units 81 through 8n by the above power equalizing control unit 123A, the second determining unit 124Ab determines the continuity state of optical propagation paths in the lower stream than the second PD unit 8b-2 (step B13 to step B16).

The second determining unit 124Ab collects results of monitoring of the optical powers from the first PD units 8b-1 of the optical attenuating units 81 through 8n, and results of monitoring of optical powers from the second PD units 8b-2, and measures the attenuation quantities in the variable attenuators 8a in the respective optical attenuating units 81 through 8n from these results of the monitoring (step B13, refer to D in FIG. 6). The second determining unit 124Ab compares each of the attenuation quantities of the variable attenuators 8a in the optical attenuating units 81 through 8n with the fifth specified value to determine the continuity state of an optical propagation path of each of the wavelength components in the upper stream than the branching unit 11*b* and the downstream than the second PD unit 8*b*-2 (step B14).

When there is any variable attenuator 8*a* corresponding to a channel whose attenuation quantity is smaller than the fifth specified value, the second determining unit 124Ab determines that abnormality occurs in an optical propagation path of this channel in the upper stream than the branching unit 11*b* and the lower stream than the second PD unit 8*b*-2, and notifies of it, together with the channel number (from NO route at step B14 to step B15).

Particularly, it is possible to specify an optical propagation path in the lower stream than the second PD unit 8*b*-2 and the upper stream than the branching unit 11*b* having a large loss. Since the loss on the optical propagation path generally increases due to a faulty splice state of an optical connector, it is possible to efficiently restore abnormality of the continuity state by checking optical connectors and the like on the specified optical propagation path (refer to E in FIG. 6).

When the attenuation quantities of the variable attenuators 8*a* corresponding to all the channels are above the fifth specified value, the second determining unit 124Ab determines that the optical propagation paths of all the channels in the upper stream than the branching unit 11*b* and the lower stream than the second PD unit 8*b*-2 are normal, and notifies of it (from YES route at step B14 to step B16).

The second embodiment of this invention has an advantage that the continuity test on optical propagation paths through optical components disposed for communications over all channels that can be accommodated including a channel that is not planned to be used at the beginning can be made easier than the known techniques because the control circuit 12A uses the ASE beam as the probe beams under control.

Since it becomes unnecessary to prepare a wavelength tunable laser or the like for the continuity test, it is possible to make the continuity test on an optical propagation path of each of all channels that can be accommodated in a shorter time and at a lower cost than the known techniques.

Incidentally, the above third to fifth specified values are set to values with which it is possible to determine, on the basis of the attenuation quantity of the variable attenuator 8*a*, whether or not a hindrance occurs at any optical connection on optical propagation path to be tested even when the loss present on an optical propagation path in the normal continuity state between at least the second PD unit 8*b*-2 and the branching unit 11*b* is subtracted.

[C] Others

Irrespective of the above embodiments, the present invention may be modified in various ways without departing from the scope of the invention.

Figure 9:
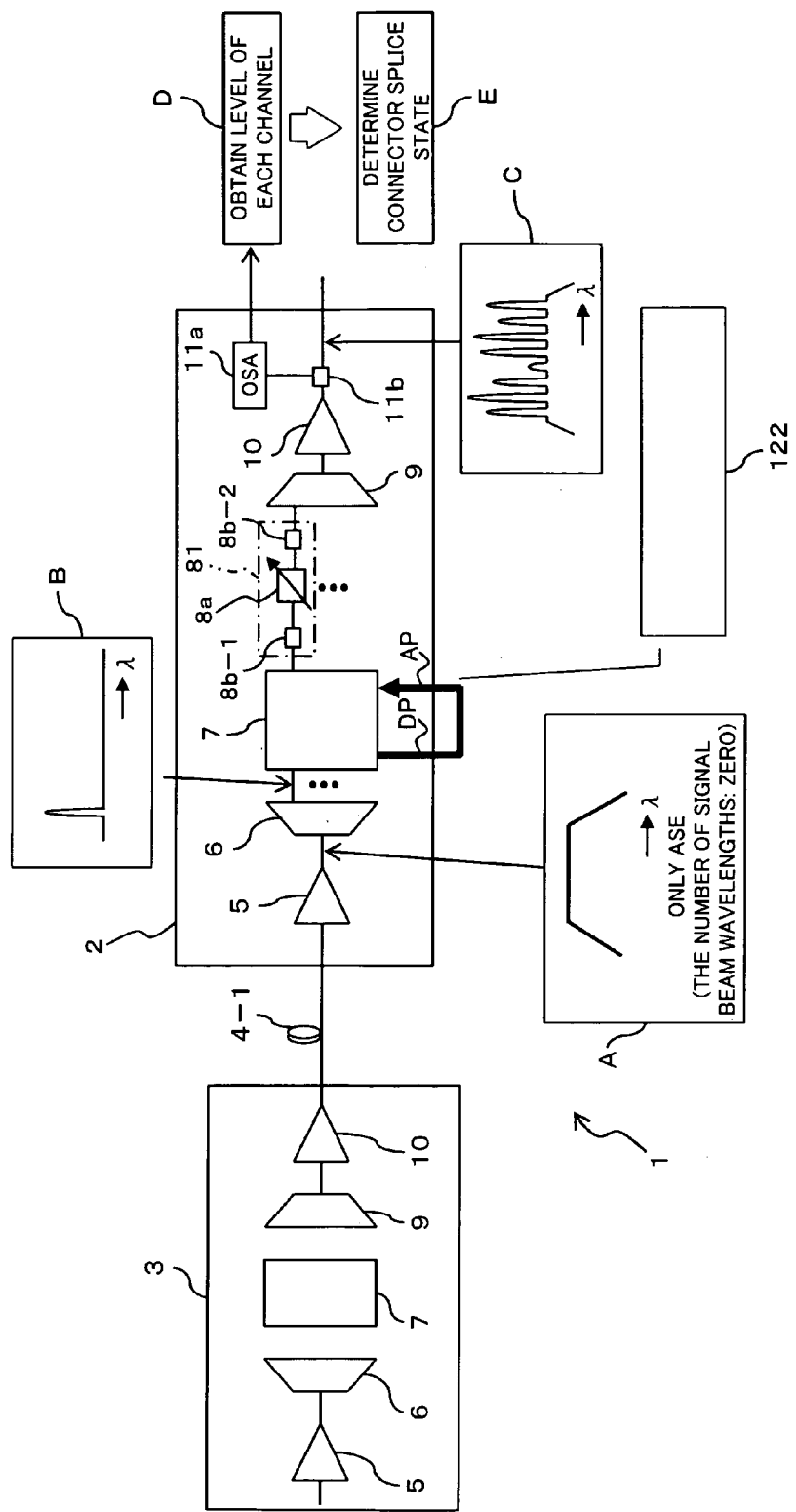
FIG. 9 is a diagram showing a modification of the first embodiment of this invention.

For example, in the first embodiment, the optical crossconnect unit 7 may not be set to "through" but to "drop/add," and the drop port DP and a corresponding add port AP may be connected to each other at their ends, whereby not only the continuity state between the transmission input port and the drop port but also the continuity state between the add port AP and the transmission output port can be tested, as shown in FIG. 9.

As the continuity test on such the drop port DP and the add port AP, it is possible to test only one channel planned to be introduced into the first OADM apparatus 2, or all the channels including a channel that is not planned to be introduced.

Namely, in the continuity test, a probe beam at each wavelength obtained by wavelength-demultiplexing the amplified spontaneous emission by the wavelength demultiplexing unit 6 is inputted through the transmission input port and dropped from the branching port (drop port). Then, the wavelength component outputted from the drop port DP in the branching process is returned as it is and added from the insert port (add port) AP in the adding process, and finally outputted through the transmission output port, under the setting control on the optical crossconnect unit 7 of the second control unit 122.

In other words, the second control unit 122 controls the optical crossconnect unit 7 so that each wavelength component of the amplified spontaneous emission outputted from the pre-amplifier 5 under the control of the first control unit 121 is inputted through the transmission input port of the optical crossconnect unit 7, and is subjected to add-drop processing.

Whereby, the first determining unit 124*a* can test the continuity state of the optical transmission path in the lower stream than the pre-amplifier 5 and the upper stream than the first PD unit 8*b*-1, together with the continuity of the drop port DP and the add port AP in the optical crossconnect unit 7.

Figure 10:
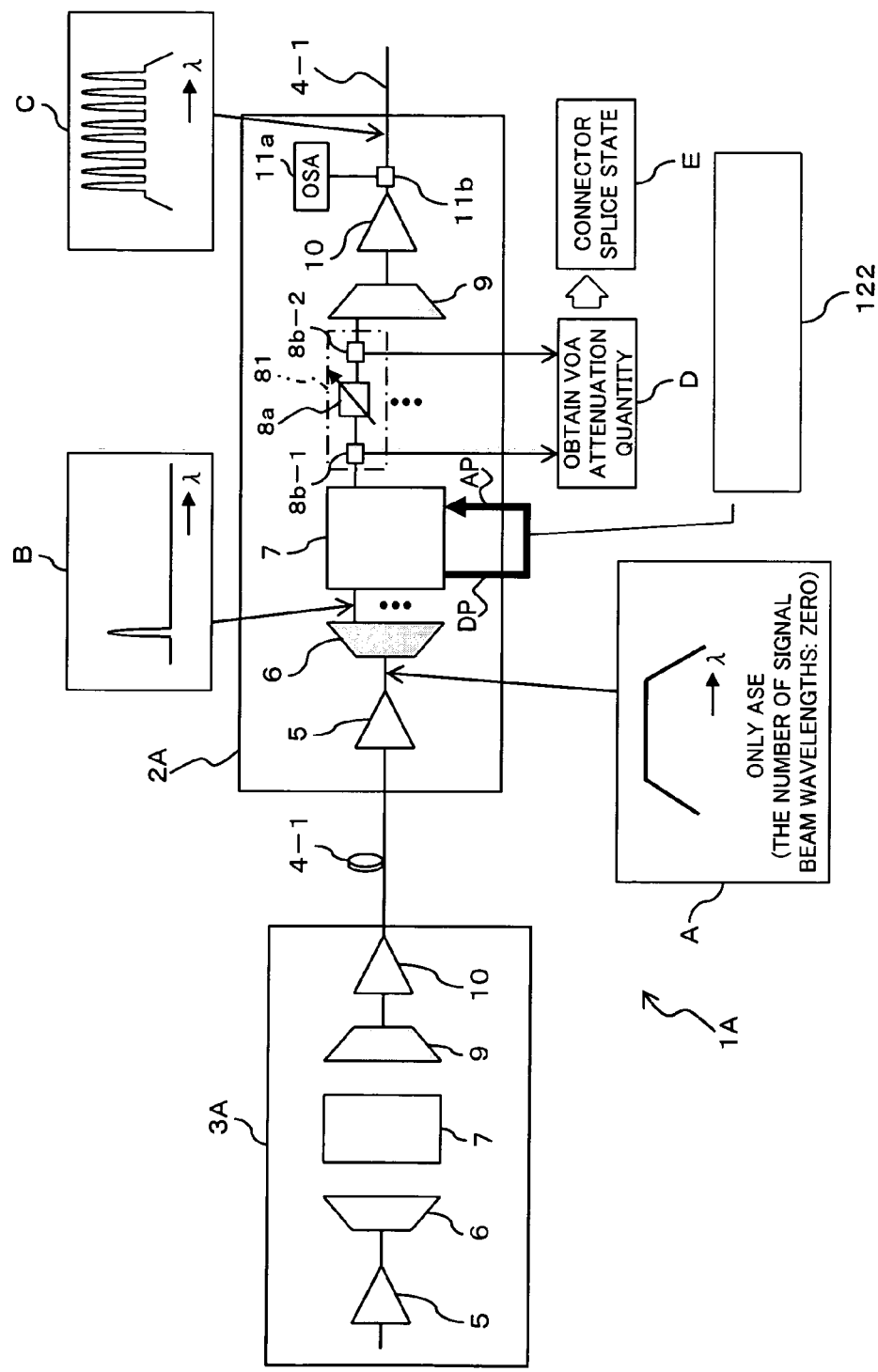
FIG. 10 is a diagram showing a modification of the second embodiment of this invention.

Similarly, in the second embodiment, the first determining unit 124Aa in the first OADM apparatus 2A can test the continuity state of the optical transmission path in the lower stream than the pre-amplifier 5 and the upper stream than the first PD unit 8*b*-1, together with the continuity of the drop port DP and the add port AP in the crossconnect unit 7, as shown in FIG. 10.

In this case, the second control unit 122 controls the optical crossconnect unit 7 so that each wavelength component of the amplified spontaneous emission outputted from the pre-amplifier 5 under the control of the first control unit 121 is inputted through the transmission input port of the optical crossconnect unit 7, and is subjected to add-drop processing as well.

As a modification, the specified values (the first specified value and the fifth specified value) which are standards to determine the continuity state by the first determining units 124*a* and 124Aa, and the second determining units 124*b* and 124Ab in the first OADM apparatuses 2 and 2A according to the first and second embodiments may be step-wisely set according to the degree of loss on the optical transmission path. Whereby, the determining units 124 and 124A can quantitatively determine how much the margin is left for an increase in the loss due to device deterioration with age in the future that is caused by continuous operation.

In the OADM node 100 shown in FIG. 11 described above, the VOA 104 is generally feed-back-controlled to control the optical power of each channel to the required level at the output of the post-amplifier 106. For this, even if an abnormally large loss is present on the path of the channel in the node 100, only monitoring of the node output is useless to detect such abnormal path loss even when the tolerance of the optical level for the path loss in the node 100 is extremely small.

According to this invention, it is possible to confirm the continuity including the degree of the path loss as above, which enables the maintenance of the optical components in expectation of an increase in loss due to device deterioration with age in the future.

In the above embodiments, the supervisory control channel is used for communication to stop the transmission of the wavelength-multiplexed signal beam between the first OADM apparatus 2 or 2A and the second OADM apparatus 3 or 3A. As another modification of this invention, the communication is possible with another structure.

In the above embodiments, in an optical transmission system having an OADM apparatus, the continuity test is made on an optical propagation path in the OADM apparatus. As still another modification, this invention can be applied to any optical transmission apparatus so long as the optical transmission apparatus has at least a preamplifier and a path, on and through which a wavelength-multiplexed signal beam is demultiplexed and propagated, because the number of optical connectors, which may cause a loss due to an increase in the number of the multiplexed wavelengths, increases.

In such case, an optical transmission apparatus having at least a preamplifier and a wavelength demultiplexing unit for wavelength-demultiplexing a beam amplified by the preamplifier comprises a preamplifier controlling unit for controlling the preamplifier so that the amplified spontaneous emission including all wavelength bands of the wavelength-multiplexed signal beam is outputted to the wavelength demultiplexing unit, with the wavelength-multiplexed signal beam not inputted, a power monitor for monitoring the optical powers of the amplified spontaneous emission from the preamplifier demultiplexed by the wavelength demultiplexing unit, and a determining unit for determining the continuity state of the optical propagation path of each of the wavelength components demultiplexed by the wavelength demultiplexing unit on the basis of a result of monitoring by the power monitor. Wherein, the preamplifier outputs the amplified spontaneous emission, with the wavelength-multiplexed signal beam not inputted, under control of the preamplifier control unit, the wavelength demultiplexing unit demultiplexes the amplified spontaneous emission outputted from the preamplifier into wavelengths, the power monitor monitors the optical power of each of the demultiplexed wavelengths of the amplified spontaneous emission demultiplexed by the wavelength demultiplexing unit on the optical path through which the amplified spontaneous emission is propagated, and the determining unit determines the continuity state of the optical path on which the amplified spontaneous emission demultiplexed by the wavelength demultiplexing unit is propagated on the basis of a result of the monitoring.

In the above embodiments, the function for the continuity test is added to the OADM apparatus. Alternatively, this invention can be attained in such a way that the function for the continuity test of the first control unit 121 and the second control unit 122 is separated from the OADM apparatus. That is, it is possible that at least the separated function units, the OSA 11a and the determining unit 124 (124A) are integrated to form a continuity test apparatus for the continuity test on an OADM apparatus or the like having the variable attenuating function shown in FIG. 11 described above.

What is claimed is:

1. An optical transmission apparatus comprising:
   a preamplifier for pre-amplifying a wavelength-multiplexed signal beam inputted through an input transmission line;
   a first control unit for controlling said preamplifier so that amplified spontaneous emission including all wavelength bands of the wavelength-multiplexed signal beam is outputted, with said wavelength-multiplexed signal beam not inputted;
   a wavelength demultiplexing unit for demultiplexing the wavelength-multiplexed signal beam amplified by said preamplifier into a plurality of wavelength components, and for demultiplexing the amplified spontaneous emission from said preamplifier into a plurality of wavelength components;
   an add/drop processing unit for performing an adding/dropping process on signal beams at the respective wavelengths;
   a multiplexing unit disposed in a lower stream than said add/drop processing unit to wavelength-multiplex the signal beams at the respective wavelengths undergone the adding/dropping process and to output through an output transmission line;
   a second control unit for controlling said add/drop processing unit so that wavelength components of the amplified spontaneous emission outputted from said wavelength demultiplexing unit are outputted as they are toward said multiplexing unit;
   an optical power monitor for detecting an optical power of each of the wavelength components of said amplified spontaneous emission outputted from said add/drop processing unit under control of said second control unit;
   a determining unit for determining a continuity state of each of optical propagation paths of the corresponding wavelength components in an upper stream than said optical power monitor based on corresponding result of monitoring by said optical power monitor; and
   a variable attenuator for variably attenuating the optical power of each of the wavelength components from said add/drop processing unit;
   wherein, said optical power monitor comprises:
   a first optical power monitor for monitoring the optical power of each of the wavelength components of the amplified spontaneous emission outputted from said add/drop processing unit in the upper stream than said variable attenuator;
   a second optical power monitor for monitoring the optical power of each of the wavelength components of the amplified spontaneous emission outputted from said add/drop processing unit from the amplified spontaneous emission wavelength-multiplexed by said multiplexing unit;
   a third optical power monitor for monitoring the optical power of each of the wavelength components attenuated by said variable attenuator in the upper stream than said multiplexing unit; and
   an attenuation quantity constant controlling unit for controlling the variable attenuator based on results of monitoring by said first and third power monitors so that an attenuation quantity of said variable attenuator for each of the wavelength components is constant;
   said determining unit comprises:
   a first determining unit for determining a continuity state of each of said optical propagation paths of the corresponding wavelength components in the upper stream than said first optical power monitor based on corresponding result of monitoring by said first optical power monitor; and
   a second determining unit for determining the continuity state of each of said optical propagation paths of the corresponding wavelength components in the upper stream than said second optical power monitor and the lower stream than said third optical power monitor based on corresponding result of monitoring by said second optical power monitor.

2. The optical transmission apparatus according to claim 1, wherein said add/drop processing unit is inputted thereto signal beams at respective wavelengths demultiplexed by said wavelength demultiplexing unit through a transmission input port and selectively outputs each of the signal beams therefrom through either a transmission output port or a drop port, while being inputted thereto, through said add port, a signal beam at a wavelength corresponding to a wavelength of the signal beam outputted through said drop port by a dropping process, and outputting the signal beam therefrom through said transmission output port; and said second control unit controls said add/drop processing unit so that each of the wavelength components of the amplified spontaneous emission outputted from said preamplifier is inputted to said add/drop processing unit through said transmission input port and outputted through said transmission output port.

3. The optical transmission apparatus according to claim 2, wherein said drop port and said add port are connected to each other at their ends; and said second control unit controls said add/drop processing unit so that each of the wavelength components of the amplified spontaneous emission outputted from said preamplifier is inputted to said add/drop processing unit through said transmission input port, dropped through said drop port, added through said add port, and outputted from said add/drop processing unit through said transmission output port.

4. The optical transmission apparatus according to claim 1, wherein said preamplifier is comprised of a fiber amplifier which is able to amplify an input beam by means of an optical fiber pumped by a pump beam; and said first control unit comprises a pump beam supply controlling unit for controlling supply of the pump beam to said optical fiber forming said fiber amplifier, with the wavelength-multiplexed signal beam not inputted, to generate the amplified spontaneous emission.

5. The optical transmission apparatus according to claim 4, wherein said first control unit comprises:

a transmission stop requesting unit for requesting a neighboring optical transmission apparatus connected through said input transmission line to stop transmission of the wavelength-multiplexed signal beam through said input transmission line when said pump beam supply controlling unit generates the amplified spontaneous emission; and a response receiving unit for receiving a response that the transmission of the wavelength-multiplexed signal beam from said neighboring optical transmission apparatus has been stopped according to a transmission stop request from said transmission stop requesting unit;

said pump beam supply controlling unit controls supply of said pump beam when said response receiving unit receives the response.

6. An optical transmission apparatus comprising:

a preamplifier for pre-amplifying a wavelength-multiplexed signal beam inputted through an input transmission line;

a first control unit for controlling said preamplifier so that amplified spontaneous emission including all wavelength bands of the wavelength-multiplexed signal beam is outputted, with said wavelength-multiplexed signal beam not inputted;

a wavelength demultiplexing unit for demultiplexing the wavelength-multiplexed signal beam amplified by said preamplifier into a plurality of wavelength components, and for demultiplexing the amplified spontaneous emission from said preamplifier into a plurality of wavelength components;

an add/drop processing unit for performing an adding/dropping process on signal beams at the respective wavelengths;

a multiplexing unit disposed in a lower stream than said add/drop processing unit to wavelength-multiplex the signal beams at the respective wavelengths undergone the adding/dropping process and to output through an output transmission line;

a second control unit for controlling said add/drop processing unit so that wavelength components of the amplified spontaneous emission outputted from said wavelength demultiplexing unit are outputted as they are toward said multiplexing unit;

an optical power monitor for detecting an optical power of each of the wavelength components of said amplified spontaneous emission outputted from said add/drop processing unit under control of said second control unit;

a determining unit for determining a continuity state of each of optical propagation paths of the corresponding wavelength components in an upper stream than said optical power monitor based on corresponding result of monitoring by said optical power monitor; and a variable attenuator for variably attenuating an optical power of each of the wavelength components from said add/drop processing unit;

wherein, said optical power monitor comprises:

a first power monitor for monitoring the optical power of each of the wavelength components of the amplified spontaneous emission outputted from said add/drop processing unit in the upper stream than said variable attenuator;

a second optical power monitor for monitoring the optical power of each of the wavelength components of the amplified spontaneous emission outputted from said add/drop processing unit in the lower stream than said multiplexing unit;

a third optical power monitor for monitoring the optical power of each of the wavelength components attenuated by said variable attenuator in the upper stream than said multiplexing unit; and a power equalizing control unit for controlling attenuation quantities of said variable attenuator based on a result of monitoring by said second optical power monitor so that the optical powers of the wavelength components monitored by said second optical power monitor are equalized; and said determining unit comprises:

a first determining unit for determining a continuity state of an optical propagation path of each of the wavelength components in the upper stream than said first optical power monitor based on a result of monitoring by said first optical power monitor; and a second determining unit for measuring, from results of monitoring by said first and third optical power monitors, the attenuation quantity of said variable attenuator controlled based on a result of monitoring by said second optical power monitor to determine the continuity state of the optical propagation path of each of the wavelength components in the upper stream than said second optical power monitor and the lower stream than said third optical power monitor based on a result of the measurement.

7. The optical transmission apparatus according to claim 6, wherein said add/drop processing unit is inputted thereto signal beams at respective wavelengths demultiplexed by said wavelength demultiplexing unit through a transmission input port and selectively outputs each of the signal beams therefrom through either a transmission output port or a drop port, while being inputted thereto, through said add port, a signal beam at a wavelength corresponding to a wavelength of the signal beam outputted through said drop port by a dropping process, and outputting the signal beam therefrom through said transmission output port; and said second control unit controls said add/drop processing unit so that each of the wavelength components of the amplified spontaneous emission outputted from said preamplifier is inputted to said add/drop processing unit through said transmission input port and outputted through said transmission output port.

8. The optical transmission apparatus according to claim 7, wherein said drop port and said add port are connected to each other at their ends; and said second control unit controls said add/drop processing unit so that each of the wavelength components of the amplified spontaneous emission outputted from said preamplifier is inputted to said add/drop processing unit through said transmission input port, dropped through said drop port, added through said add port, and outputted from said add/drop processing unit through said transmission output port.

9. The optical transmission apparatus according to claim 6, wherein said preamplifier is comprised of a fiber amplifier which is able to amplify an input beam by means of an optical fiber pumped by a pump beam; and said first control unit comprises a pump beam supply controlling unit for controlling supply of the pump beam to said optical fiber forming said fiber amplifier, with the wavelength-multiplexed signal beam not inputted, to generate the amplified spontaneous emission.

10. The optical transmission apparatus according to claim 9, wherein said first control unit comprises:

a transmission stop requesting unit for requesting a neighboring optical transmission apparatus connected through said input transmission line to stop transmission of the wavelength-multiplexed signal beam through said input transmission line when said pump beam supply controlling unit generates the amplified spontaneous emission; and a response receiving unit for receiving a response that the transmission of the wavelength-multiplexed signal beam from said neighboring optical transmission apparatus has been stopped according to a transmission stop request from said transmission stop requesting unit;

said pump beam supply controlling unit controls supply of said pump beam when said response receiving unit receives the response.

11. A continuity testing method in an optical transmission apparatus including a preamplifier for pre-amplifying a wavelength-multiplexed signal beam inputted through an input transmission line, a wavelength demultiplexing unit for wavelength-demultiplexing the wavelength-multiplexed signal beam from said preamplifier into wavelengths, an add/drop processing unit for performing an adding/dropping process on a signal beam at each of the wavelengths wavelength-demultiplexed by said wavelength demultiplexing unit, and a multiplexing unit disposed in a lower stream than said add/drop processing unit to wavelength-multiplex signal beams at the respective wavelengths undergone the adding/dropping process and to be outputted through an output transmission path, comprising the steps of:

controlling said preamplifier so that amplified spontaneous emission including all wavelength bands to be undergone an output route switching process by said add/drop processing unit is outputted therefrom, with said wavelength-multiplexed signal beam not inputted;

controlling said add/drop processing unit so that wavelength components of said amplified spontaneous emission outputted from said wavelength demultiplexing unit are outputted as they are toward said multiplexing unit;

monitoring an optical power of each of the wavelength components of the amplified spontaneous emission outputted from said add/drop processing unit and propagated through a plurality of optical propagation paths, respectively; and determining a continuity state of each of an optical propagation paths in an upper stream than a position at which the optical power is monitored, on the basis of corresponding result of the monitoring, wherein the optical power of each of the wavelength components of the amplified spontaneous emission outputted from said add/drop processing unit is monitored by a first optical power monitor disposed in the upper stream than said multiplexing unit;

the continuity state of an optical propagation path of each of the wavelength components in the upper stream than said first optical power monitor is determined on the basis of based on a result of monitoring by said first optical power monitor;

when the continuity state is determined to be normal as a result of determination of the continuity state on the basis of the result of monitoring by said first optical power monitor, the optical power of each of the wavelength components of the amplified spontaneous emission outputted from said add/drop processing unit is monitored by a second optical monitor disposed in the lower stream than said multiplexing unit; and the continuity state of an optical propagation path of each of the wavelength components in the upper stream than said second optical power monitor and the lower stream than said first optical power monitor is determined on the basis of based on a result of monitoring by said second optical power monitor.

12. An optical transmission system in which a first optical transmission apparatus being connected to a second optical transmission apparatus through an input transmission line, said first optical transmission apparatus comprising:

a preamplifier for pre-amplifying a wavelength-multiplexed signal beam inputted through said input transmission line;

a first control unit for controlling said preamplifier so that amplified spontaneous emission including all wavelength bands of the wavelength-multiplexed signal beam is outputted, with said wavelength-multiplexed signal beam not inputted from said second optical transmission apparatus;

a wavelength demultiplexing unit for demultiplexing the wavelength-multiplexed signal beam amplified by said preamplifier into a plurality of wavelength components, and for demultiplexing the amplified spontaneous emission from said preamplifier into a plurality of wavelength components;

an add/drop processing unit for performing an adding/dropping process on signal beams at the respective wavelengths;

a multiplexing unit disposed in a lower stream than said add/drop processing unit to wavelength-multiplex the signal beams at the respective wavelengths undergone the adding/dropping process and to output through an output transmission line;

a second control unit for controlling said add/drop processing unit so that wavelength components of the amplified spontaneous emission outputted from said wavelength demultiplexing unit are outputted as they are toward said multiplexing unit;

an optical power monitor for detecting an optical power of each of the wavelength components of the amplified spontaneous emission outputted from said add/drop processing unit under control of said second control unit;

a determining unit for determining a continuity state of each of an optical propagation path of the corresponding wavelength components in an upper stream than said optical power monitor on the basis of corresponding result of monitoring by said optical power monitor; and a variable attenuator for variably attenuating the optical power of each of the wavelength components from said add/drop processing unit;

wherein, said optical power monitor comprises:

a first optical power monitor for monitoring the optical power of each of the wavelength components of the amplified spontaneous emission outputted from said add/drop processing unit in the upper stream than said variable attenuator;

a second optical power monitor for monitoring the optical power of each of the wavelength components of the amplified spontaneous emission outputted from said add/drop processing unit from the amplified spontaneous emission wavelength-multiplexed by said multiplexing unit;

a third optical power monitor for monitoring the optical power of each of the wavelength components attenuated by said variable attenuator in the upper stream than said multiplexing unit; and an attenuation quantity constant controlling unit for controlling the variable attenuator based on results of monitoring by said first and third power monitors so that an attenuation quantity of said variable attenuator for each of the wavelength components is constant;

said determining unit comprises:

a first determining unit for determining a continuity state of each of said optical propagation paths of the corresponding wavelength components in the upper stream than said first optical power monitor en-based on corresponding result of monitoring by said first optical power monitor; and a second determining unit for determining the continuity state of each of said optical propagation paths of the corresponding wavelength components in the upper stream than said second optical power monitor and the lower stream than said third optical power monitor based on corresponding result of monitoring by said second optical power monitor.

13. The optical transmission system according to claim 12, wherein said preamplifier is comprised of a fiber amplifier which can amplify an input beam by means of an optical fiber pumped by a pump beam;

said first control unit of said first optical transmission apparatus comprises:

a transmission stop requesting unit for requesting said second optical transmission apparatus connected through said input transmission line to stop transmission of the wavelength-multiplexed signal beam through said input transmission line when an amplified spontaneous emission generation controlling unit generates the amplified spontaneous emission;

a response receiving unit for receiving a response that transmission of said wavelength-multiplexed signal beam from said second optical transmission apparatus has been stopped according to a transmission stop request from said transmission stop requesting unit; and a pump beam supply controlling unit for controlling supply of the pump beam to said optical fiber forming said fiber amplifier to generate the amplified spontaneous emission when said response receiving unit receives the response;

said second optical transmission apparatus comprises:

a stop request receiving unit for receiving the request from said transmission stop requesting unit;

a stopping process unit for stopping transmission of the wavelength-multiplexed signal beam to said first optical transmission apparatus according to the request received by said stop request receiving unit; and a response transmitting unit for transmitting to said first optical transmission apparatus an effect that stopping of the transmission of said wavelength-multiplexed signal beam is completed as a response when said stopping process unit stops the transmission of the wavelength-multiplexed signal beam.

14. An optical transmission system in which a first optical transmission apparatus being connected to a second optical transmission apparatus through an input transmission line, said first optical transmission apparatus comprising:

a preamplifier for pre-amplifying a wavelength-multiplexed signal beam inputted through said input transmission line;

a first control unit for controlling said preamplifier so that amplified spontaneous emission including all wavelength bands of the wavelength-multiplexed signal beam is outputted, with said wavelength-multiplexed signal beam not inputted from said second optical transmission apparatus;

a wavelength demultiplexing unit for demultiplexing the wavelength-multiplexed signal beam amplified by said preamplifier into a plurality of wavelength components, and for demultiplexing the amplified spontaneous emission from said preamplifier into a plurality of wavelength components;

an add/drop processing unit for performing an adding/dropping process on signal beams at the respective wavelengths;

a multiplexing unit disposed in a lower stream than said add/drop processing unit to wavelength-multiplex the signal beams at the respective wavelengths undergone the adding/dropping process and to output through an output transmission line;

a second control unit for controlling said add/drop processing unit so that wavelength components of the amplified spontaneous emission outputted from said wavelength demultiplexing unit are outputted as they are toward said multiplexing unit;

an optical power monitor for detecting an optical power of each of the wavelength components of the amplified spontaneous emission outputted from said add/drop processing unit under control of said second control unit;

a determining unit for determining a continuity state of each of an optical propagation path of the corresponding wavelength components in an upper stream than said optical power monitor on the basis of corresponding result of monitoring by said optical power monitor; and a variable attenuator for variably attenuating the optical power of each of the wavelength components from said add/drop processing unit;

wherein, said optical power monitor comprises:

a first optical power monitor for monitoring the optical power of each of the wavelength components of the amplified spontaneous emission outputted from said add/drop processing unit in the upper stream than said variable attenuator;

a second optical power monitor for monitoring the optical power of each of the wavelength components of the amplified spontaneous emission outputted from said add/drop processing unit from the amplified spontaneous emission wavelength-multiplexed by said multiplexing unit;

a third optical power monitor for monitoring the optical power of each of the wavelength components attenuated by said variable attenuator in the upper stream than said multiplexing unit; and a variable attenuator for variably attenuating an optical power of each of the wavelength components from said add/drop processing unit;

wherein, said optical power monitor comprises:

a first power monitor for monitoring the optical power of each of the wavelength components of the amplified spontaneous emission outputted from said add/drop processing unit in the upper stream than said variable attenuator;

a second optical power monitor for monitoring the optical power of each of the wavelength components of the amplified spontaneous emission outputted from said add/drop processing unit in the lower stream than said multiplexing unit;

a third optical power monitor for monitoring the optical power of each of the wavelength components attenuated by said variable attenuator in the upper stream than said multiplexing unit; and a power equalizing control unit for controlling attenuation quantities of said variable attenuator based on a result of monitoring by said second optical power monitor so that the optical powers of the wavelength components monitored by said second optical power monitor are equalized; and said determining unit comprises:

a first determining unit for determining a continuity state of an optical propagation path of each of the wavelength components in the upper stream than said first optical power monitor based on a result of monitoring by said first optical power monitor; and a second determining unit for measuring, from results of monitoring by said first and third optical power monitors, the attenuation quantity of said variable attenuator controlled based on a result of monitoring by said second optical power monitor to determine the continuity state of the optical propagation path of each of the wavelength components in the upper stream than said second optical power monitor and the lower stream than said third optical power monitor based on a result of the measurement.

15. The optical transmission system according to claim 14, wherein said preamplifier is comprised of a fiber amplifier which can amplify an input beam by means of an optical fiber pumped by a pump beam;

said first control unit of said first optical transmission apparatus comprises:

a transmission stop requesting unit for requesting said second optical transmission apparatus connected through said input transmission line to stop transmission of the wavelength-multiplexed signal beam through said input transmission line when an amplified spontaneous emission generation controlling unit generates the amplified spontaneous emission;

a response receiving unit for receiving a response that transmission of said wavelength-multiplexed signal beam from said second optical transmission apparatus has been stopped according to a transmission stop request from said transmission stop requesting unit; and a pump beam supply controlling unit for controlling supply of the pump beam to said optical fiber forming said fiber amplifier to generate the amplified spontaneous emission when said response receiving unit receives the response;

said second optical transmission apparatus comprises:

a stop request receiving unit for receiving the request from said transmission stop requesting unit;

a stopping process unit for stopping transmission of the wavelength-multiplexed signal beam to said first optical transmission apparatus according to the request received by said stop request receiving unit; and a response transmitting unit for transmitting to said first optical transmission apparatus an effect that stopping of the transmission of said wavelength-multiplexed signal beam is completed as a response when said stopping process unit stops the transmission of the wavelength-multiplexed signal beam.

* * * * *